United States Patent [19]

Shimoyoshi et al.

[11] Patent Number: 5,381,143
[45] Date of Patent: Jan. 10, 1995

[54] DIGITAL SIGNAL CODING/DECODING APPARATUS, DIGITAL SIGNAL CODING APPARATUS, AND DIGITAL SIGNAL DECODING APPARATUS

[75] Inventors: Osamu Shimoyoshi; Kenzo Akagiri; Miki Abe, all of Kanagawa; Takahiro Watanabe, Tokyo, all of Japan

[73] Assignee: Sony Corporation, Japan

[21] Appl. No.: 118,495

[22] Filed: Sep. 8, 1993

[30] Foreign Application Priority Data

Sep. 11, 1992 [JP] Japan .................................. 4-243575

[51] Int. Cl.$^6$ .............................................. H03M 7/00
[52] U.S. Cl. .......................................... 341/51; 381/37
[58] Field of Search ....................... 341/50, 51, 54, 64; 381/36, 37, 30, 41, 31; 364/513.5

[56] References Cited

U.S. PATENT DOCUMENTS

| | | | |
|---|---|---|---|
| 4,184,049 | 1/1980 | Crochiere et al. | 179/1 |
| 4,455,649 | 6/1984 | Esteban et al. | 370/80 |
| 4,535,472 | 8/1985 | Tomcik | 381/31 |
| 4,896,362 | 1/1990 | Veldhuis et al. | 381/30 |
| 4,932,062 | 6/1990 | Hamilton | 381/43 |
| 4,972,484 | 11/1990 | Theile et al. | 381/37 |
| 5,049,992 | 9/1991 | Citta et al. | 358/140 |
| 5,109,417 | 4/1992 | Fielder et al. | 381/36 |
| 5,115,240 | 5/1992 | Fujiwara et al. | 341/51 |
| 5,117,228 | 5/1992 | Fuchigami et al. | 341/200 |
| 5,134,475 | 7/1992 | Johnston et al. | 358/133 |
| 5,142,656 | 8/1992 | Fielder et al. | 381/37 |
| 5,151,941 | 9/1992 | Nishiguchi et al. | 381/46 |
| 5,157,760 | 10/1992 | Akagiri | 395/2 |
| 5,166,686 | 11/1992 | Sugiyama | 341/155 |
| 5,185,800 | 2/1993 | Mahieux | 381/29 |

FOREIGN PATENT DOCUMENTS

| | | | |
|---|---|---|---|
| 0145788A1 | 6/1985 | European Pat. Off. | H04B 12/02 |
| 0255111A2 | 2/1988 | European Pat. Off. | G11B 20/10 |
| 0424016A2 | 10/1990 | European Pat. Off. | H04B 1/66 |
| 0409248A2 | 1/1991 | European Pat. Off. | H03M 7/30 |
| 0420745A2 | 4/1991 | European Pat. Off. | H04B 1/66 |
| 0525809A2 | 2/1993 | European Pat. Off. | H04B 1/66 |

OTHER PUBLICATIONS

Brandenburg et al., "Aspec: Adaptive Spectral Entropy Coding of High Quality Music Signals," Audio Engineering Society Preprint No. 3011 (1991 Feb.).

Davidson et al., "Low Complexity Transform Coder for Satellite Link Applications" Audio Engineering Society Preprint No. 2966 (1990 Sep.).

(List continued on next page.)

*Primary Examiner*—Brian K. Young
*Attorney, Agent, or Firm*—Limbach & Limbach

[57] ABSTRACT

A digital signal processing system comprising a compressor, an expander and a scale-down circuit. The compressor includes non-block frequency analyzer that frequency analyzes the digital input digital signal, without dividing it into block, to provide a frequency range signal in each of plural frequency ranges. A block frequency analyzer divides the frequency range signals into blocks and performs a block frequency analysis of each block of the frequency range signals to provide a block of spectral coefficients. A quantizer quantizes the block of spectral coefficients from the block frequency analyzer to provide a block of a compressed signal. The expander includes a block frequency synthesizer that performs a block frequency synthesis to transform, from the frequency domain to the time domain, the spectral coefficients in each of the frequency ranges in each block of the compressed signal to provide, in each of the frequency ranges, a block of a reproduced frequency range signal. A non-block frequency synthesizer synthesizes the reproduced frequency range signals, without dividing them into blocks, to provide the digital output signal. Finally, the system includes a scale-down circuit that scales down values in the block frequency analysis performed by the block frequency analyzer or the block frequency synthesis performed by the block frequency synthesizer. The scale-down circuit operates to cause the noise levels resulting from scaling down the values to be different in each of the frequency ranges.

34 Claims, 12 Drawing Sheets

OTHER PUBLICATIONS

Esteban et al., "Application of Quadrature Mirror Filters To Split Band Voice Coding Schemes," Record of the 1977 ICASSP, pp. 191–195 (1977 May).

R. E. Crochiere, S. A. Webber and J. L. Flanagan, "Digital Coding of Speech in Sub-bands," in *The Bell System Technical Journal*, pp. 1069–1085, vol. 55, No. 8, Oct. 1976, USA.

Joseph H. Rothweller, "Polyphase Quadrature Filters–A New Subband Coding Technique," *ICASSP*, pp. 1280–1283, Jun. 1983, Boston, USA.

Rainer Zelinski and Peter Noll, "Adaptive Transform Coding of Speech Signals," *IEEE Transactions on Acoustics, Speech, and Signal Processing*, pp. 299–330, vol. ASSP-25, No. 4, Aug. 1977.

Michael A. Krasner, "The Critical Band Coder–Digital Encoding of Speech Signals Based on the Perceptual Requirements of the Auditory System," *IEEE Transactions on Acoustics, Speech, and Signal Processing*, pp. 327–331, vol. 3, Apr. 1980.

Johnston, "Transform Coding of Audio Signals Using Perceptual Noise Criteria," 6 IEEE Trans. on Selected Areas in Communications, 314–323 (1988 Feb.).

Schroeder et al., "High Quality Digital Audio Encoding with 3.0 Bits/Sample Using Adaptive Transform Coding," Audio Engineering Society Reprint No. 2321 (1986 Mar.).

Stoll et al., "Masking–Pattern Adapted Sub–Band Coding: Use of the Dynamic Bit-Rate Margin," Audio Engineering Society Preprint No. 2585 (1988 Mar.).

DIGITAL SIGNAL CODING/DECODING APPARATUS, DIGITAL SIGNAL CODING APPARATUS, AND DIGITAL SIGNAL DECODING APPARATUS

FIELD OF THE INVENTION

This invention relates to an apparatus and system that orthogonally transforms a digital information signal from a first domain to a second domain, in which processing overflow is prevented by a scale down operation.

DESCRIPTION OF THE PRIOR ART

Technologies for compressing a digital audio signal are known in which the digital audio input signal is orthogonally transformed, the resulting spectral coefficients are divided in frequency into bands to which block floating processing is applied. The spectral coefficients in each band are then quantized to provide a compressed signal for recording on a recording medium, for transmission, or for distribution. It is also known to include block floating information and quantizing information in the compressed signal together with the quantized spectral coefficients. In the following description, whenever the words "recording" and "recording medium" are used, it will be understood that these terms encompass transmitting and distribution, and transmission and distribution media.

The above-mentioned block floating technique involves multiplying the spectral coefficients in each band by a common value to increase their values. This enables the accuracy of the quantizing to be improved. For example, there is the block floating technique in which the maximum of the absolute values (i.e., the maximum absolute value) of the spectral coefficients in the band is identified, and block floating processing is applied to all the spectral coefficients in the band using a common block floating coefficient, so that no value greater than the maximum absolute value is produced. This prevents a numerical overflow in the processing apparatus. Block floating using bit shifting is a simpler block floating technique, but has a maximum resolution of 6 dB.

In conventional orthogonal transform processing, without use of block floating, sufficient accuracy can be ensured at all input levels by using an operational word length that sufficiently long to prevent the word length accuracy of the signal input to the orthogonal transform circuit from being damaged by the orthogonal transform processing.

An additional approach is employed to improve the analysis accuracy of the orthogonal transform in which the block size to which the orthogonal transform processing is applied is made variable, depending upon the temporal properties, i.e., dynamics, of the signal. In this approach, the root mean square values of the differences between adjacent samples of the signal may be used, for example, as a judgment index for determining the block size.

In the orthogonal transform processing operation, the operational word length must be increased to provide the required degree of accuracy. To accommodate such increased word lengths, the scale of the hardware must be made large, resulting in increased costs of manufacture. Also, when the block size to which the orthogonal transform processing is applied is made variable, the need to determine a judgment index solely for this purpose results in an increase in the number of processing steps.

Further, determining the maximum absolute value in the block floating processing requires processing steps to determine whether or not, for each spectral coefficient in the block, the absolute value of the current spectral coefficient is larger than the maximum absolute value of the spectral coefficients already processed. This requires a large number of processing steps, which require a large amount of time to execute.

In view of facts described above, there has been proposed a technique for compressing and expanding a digital audio input signal in which filters are used to divide the digital audio input signal into a frequency range signal in each of plural frequency ranges. Each frequency range signal is divided in time into blocks of plural samples. First block floating is applied to each block of samples, and orthogonal transform processing is applied to each processed block. The resulting spectral coefficients are grouped by frequency into bands, and second block floating processing is applied to the spectral coefficients in each band. The bands of block-floating processed spectral coefficients are then quantized to provide a compressed signal for recording, transmission, or distribution. The processing just described prevents degradation of the accuracy of the orthogonal transform operation.

In the expander complementary to the just-described compressor, after the quantizing and the second block floating of spectral coefficients in the compressed signal are released, the spectral coefficients are subject to inverse orthogonal transform processing. The first block floating of the blocks of samples in the time domain resulting from the inverse orthogonal transform processing is released, and the resulting plural frequency range signals are synthesized using suitable inverse filters to provide the digital audio output signal.

In the technique just described, since the magnitude of the first block floating is determined by taking the maximum value of the samples or the absolute values of the samples in each block subject to block floating, in a frequency range in which the frequency range signal has a relatively large value, applying block floating results in relatively large processing errors, which manifest themselves as audible noise. The noise resulting from the processing errors is audible because audio signals generally have signal components towards lower frequencies with amplitudes larger than signal components towards higher frequencies. Consequently, there are many instances where the noise level is greater towards lower frequencies than towards higher frequencies.

However, the human sense of hearing has a greater sensitivity to noise towards lower frequencies. Therefore, there are instances where a greater noise level towards lower frequencies may be problematical because it is subjectively more noticeable. While noise towards lower frequencies may not be noticed because of the masking effect of the human sense of hearing, masking cannot be relied on to render noise towards lower frequencies inaudible in the presence of all audio signals.

For example, the two audio signals shown in FIGS. 12(a) and 12(b) have the same maximum signal level, which gives rise to the same noise level due to operational errors. This noise will be heard in the presence of the audio signal shown in FIG. 12(a) because this signal is relatively tonal, and, consequently, has a relatively narrow masking range. The audio signal shown in FIG. 12(b) has a relatively broad spectrum, which effectively masks the noise. Attempts to reduce quantizing noise by increasing the operational word length, or by carrying out the processing with double precision, etc., results in an increase in the scale, and hence the cost, of the hardware required.

OBJECT AND SUMMARY OF THE INVENTION

The invention has been proposed in view of the circumstances described above, and its object is to provide an apparatus and system for carrying out the orthogonal transform processing and the inverse orthogonal transform processing used in digital signal compression and digital signal expansion with a smaller scale of hardware and fewer processing operations.

Accordingly, the invention provides a digital signal processing system in which a digital input signal is compressed to provide a compressed signal for recording on a medium, and the compressed signal, reproduced from the medium, is expanded to provide a digital output signal. The system comprises a compressor, and expander, and a scale-down circuit. The compressor includes a non-block frequency analyzer that carries out a frequency analysis of the digital input digital signal to provide a frequency range signal in each of plural frequency ranges. The non-block frequency analyzer carries out the frequency analysis without dividing the digital input signal into blocks. A block frequency analyzer carries out a block frequency analysis of the frequency range signals from the non-block frequency analyzer to provide a block of spectral coefficients. The block frequency analyzer includes a circuit that divides the frequency range signals in time into blocks. Finally, the compressor includes a quantizer that quantizes the block of spectral coefficients from the block frequency analyzer to provide a block of the compressed signal.

The expander includes a block frequency synthesizer that performs a block frequency synthesis to transform, from the frequency domain to the time domain, the spectral coefficients in each of the frequency ranges in each block of the compressed signal reproduced from the medium. The block frequency synthesizer provides, in each of the frequency ranges, a block of a reproduced frequency range signal. A non-block frequency synthesizer conducts frequency synthesis of the reproduced frequency range signals from the block frequency synthesizer to provide the digital output signal. The non-block frequency synthesizer conducts the frequency synthesis without dividing the reproduced frequency range signals into blocks.

The scale-down circuit scales down values in the block frequency analysis performed by the block frequency analyzer or the block frequency synthesis performed by the block frequency synthesizer. The scale-down circuit operates to cause the noise levels resulting from scaling down the values to be different in each of the frequency ranges.

In the digital signal processing system of the invention, the scale down circuit operates to make the resulting noise levels, as perceived by the human sense of hearing, different in each of the frequency ranges. Further, scale down circuit operates to reduce the resulting noise level in a frequency range in which the human sense of hearing requires a large dynamic range. In particular, scale down circuit operates to reduce the resulting noise level in the low frequency range, or in the low frequency range and the medium frequency range, in which the human sense of hearing requires a large dynamic range.

On the other hand, the scale down circuit is simplified in frequency ranges in which the human sense of hearing does not require a particularly large dynamic range to reduce the scale of the hardware required to implement the scale down circuit. Especially, the scale down circuit is simplified in higher frequency ranges, in which the human sense of hearing does not require a particularly large dynamic range.

Further, the scale down circuit scales down the values in the processing of the orthogonal transform operation carried out by the block frequency analyzer or in the processing of the inverse orthogonal transform operation performed by the block frequency synthesizer in each of the frequency ranges. The scale down circuit performs an adaptive scale down operation in which the values are scaled down a number of times adaptively determined by judgment of the values in the processing of the orthogonal transform operation. In this processing, the number of times that the scale down operation is performed may be adaptively determined in response to a judgment of the magnitude of the tonality of a signal.

Further, in the orthogonal transform processing performed by the block frequency analyzer, block floating processing is carried out in each of the frequency ranges. In the process of performing the inverse orthogonal transform processing in the block frequency synthesizer, the block floating is released. The block floating is released by repeatedly carrying out scale down operations in the process of the inverse orthogonal transform operation. The number of scale down operations is made to correspond to the magnitude of the block floating. By carrying out such a scale down operation, an overflow is prevented.

Further, in the orthogonal transform processing performed by the block frequency analyzer or in the inverse orthogonal transform processing performed by the block frequency synthesizer in at least one of the higher frequency ranges, the adaptive scale down operation is not carried out. On the other hand, in the orthogonal transform processing performed by the block frequency analysis means or in the inverse orthogonal transform processing performed by the block frequency synthesis means, the adaptive scale down operation is performed only in a lower frequency range.

In the digital signal processing system according to the invention, the digital input signal is divided into a frequency range signal in each of plural frequency bands by a non-block frequency analyzer such as a filter. This allows the scale down operations required to prevent processing overflows in the orthogonal transform processing carried out in each of the frequency ranges to be performed in a way that makes the relative noises levels resulting from the degradation of the operational accuracy of the orthogonal transform processing in each frequency range to accord with the noise sensitivity characteristics of the human sense of hearing. In practice, adaptively-determined scale down processing is used in at least in a lower frequency range to minimize the degradation of the operational accuracy in this frequency range. This minimizes the noise level in this frequency range in accordance with to the noise sensitivity characteristic of the human sense of hearing.

Further, to minimize the degradation of the operational accuracy, the following approach may be employed. The scale down operation combined with block floating is adaptively determined by judgment of the values in the processing of the orthogonal transform operation. The scale down operation is carried out adaptively so as to include judgment of the magnitude of tonality of an input signal. By employing such an approach, the number of scale down operation, which constitutes one cause of operational accuracy degradation, is minimized, and the scale down operation is controlled to prevent a processing overflow. This makes it possible to minimize the noise level resulting from the operational errors to one at which the noise is masked, and is therefore inaudible.

Further, in the orthogonal transform processing or the inverse orthogonal transform processing in at least one of the higher frequency ranges, the adaptive scale down operation is omitted to reduce the quantity of scale down processing operations, thereby solving one of the above-mentioned problems.

In accordance with this invention, since the orthogonal transform and inverse transform operation accuracies can be reduced to a reasonable degree in consideration of processing efficiency and the characteristics of the human sense of hearing, a reduction in the scale of the hardware and a reduction in the quantity of processing operations can be attained.

The invention also provides an apparatus for compressing a digital input signal to provide a compressed signal. The apparatus comprises a filter circuit that divides the digital input signal by frequency to provide a frequency range signal in each of plural frequency ranges. A first block floating circuit applies applying first block floating processing to a block of the frequency range signal in each of the frequency ranges to provide a block floating processed signal in each frequency range. An orthogonal transform circuit carries out orthogonal transform processing of the block of the block floating processed signal in each of the frequency ranges to provide spectral coefficients. The orthogonal transform circuit includes a scale circuit that performs scale down operations on values processed by the orthogonal transform circuit in each of the frequency ranges. The scale down circuit carries out an adaptively-controlled scale down operation on the values in the orthogonal transform processing in at least a lower frequency one of the frequency ranges. The scale down circuit also carries out a fixed scale down operation on the values in the orthogonal transform processing in a higher frequency one of the frequency ranges. A second block floating circuit applies second block floating processing to blocks of the spectral coefficients. The blocks of spectral coefficients are obtained by grouping the spectral coefficients by frequency, and have a block size smaller than the block size of the blocks to which the first block floating processing is applied. Finally, a quantizer quantizes the second block floating processed spectral coefficients to provide the compressed signal.

The invention additionally provides an apparatus for expanding a compressed digital signal to provide an output signal. The compressed digital signal is obtained by deriving from a digital input signal a frequency range signal in each of plural frequency ranges. First block floating processing is applied to a block of the frequency range signal in each of the frequency ranges to provide a block floating processed signal in each of the frequency ranges. Orthogonal transform processing is applied to the block floating processed signal in each of the frequency ranges to provide spectral coefficients. Second block floating processing is applied to blocks of the spectral coefficients. The blocks of spectral coefficients are obtained by grouping the spectral coefficients by frequency, and have a block size smaller than the block size of the blocks to which the first block floating processing is applied. The second block floating processed spectral coefficients are quantized to provide the compressed signal.

The apparatus comprises a second block floating release circuit that releases the second block floating to provide second block floating released spectral coefficients. An inverse orthogonal transform circuit that carries out inverse orthogonal transform processing of a block of the second block floating released spectral coefficients in each of the frequency ranges to provide a recovered frequency range signal in each of the frequency ranges. The inverse orthogonal transform circuit includes a circuit that performs an adaptively-controlled scale down operation on values in the inverse orthogonal transform processing of the second block floating released spectral coefficients in at least a lower frequency one of the frequency ranges. The inverse orthogonal transform circuit also includes a circuit that conducts a fixed scale down operation on values in the inverse orthogonal transform processing of the second block floating released spectral coefficients in a higher frequency one of the frequency ranges. Finally, the apparatus includes a synthesizer that synthesizes the recovered frequency range signals to provide the output signal.

Finally, the invention provides a digital signal expander in which a compressed signal is expanded to provide a digital output signal. The compressed signal is obtained by conducting a non-block frequency analysis of a digital input signal to provide a frequency range signal in each of plural frequency ranges. Each frequency range signal is divided into blocks. A block frequency analysis is carried out on every block of the frequency range signal in each of the frequency ranges to provide spectral coefficients. The spectral coefficients are quantized to provide a block of the compressed signal. The expander comprises a block frequency synthesizer that performs a block frequency synthesis to transform, from the frequency domain to the time domain, the spectral coefficients in each of the frequency ranges in each block of the compressed signal. The block frequency synthesizer provides, in each of the frequency ranges, a block of a reproduced frequency range signal. The expander also includes a non-block frequency synthesizer that performs a frequency synthesis of the reproduced frequency range signals from the non-block frequency synthesizer to provide the digital output signal. The non-block frequency synthesizer performs the frequency synthesis without dividing the reproduced frequency ranges signals into blocks. Finally, the expander includes a scale-down circuit that scales down values in the block frequency synthesis performed by the block frequency synthesizer. The scale-down circuit operates to cause the noise levels resulting from scaling down the values to be different in each of the frequency ranges.

DESCRIPTION OF THE PREFERRED EMBODIMENTS

Preferred embodiments of this invention will now be described with reference to the attached drawings.

Figure 1:
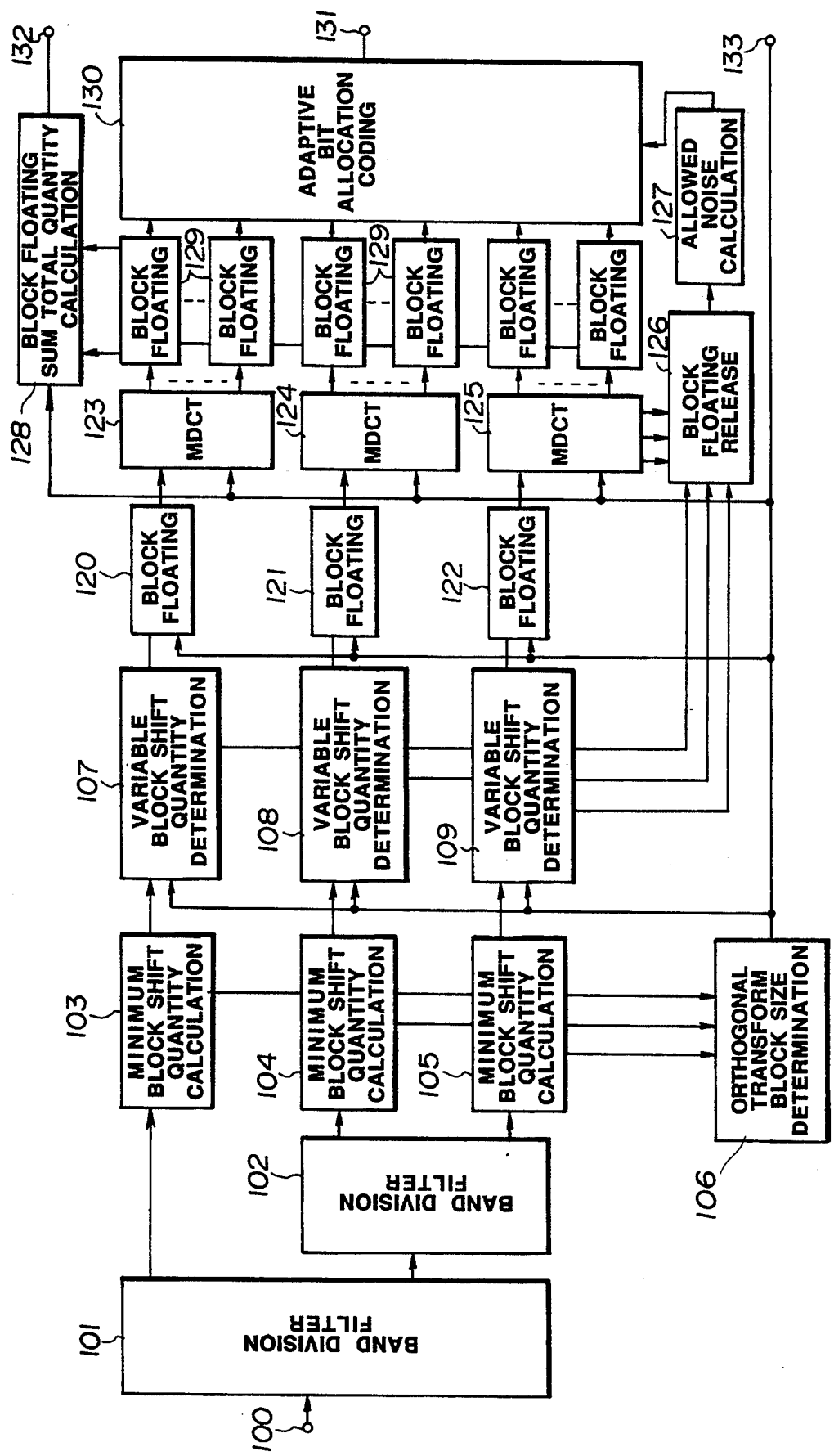
FIG. 1 a block diagram showing a digital signal compressor according to the invention.

FIG. 1 shows a digital signal compressor according to the invention in which the digital input signal is divided into plural frequency range signals by the frequency range division filters 101 and 102, which perform a non-block frequency analysis by carrying out a frequency analysis of the digital input signal without dividing it into blocks. The MDCT circuits 123, 124, and 125 perform a block frequency analysis on the digital input signal by orthogonally transforming each frequency range signal from the time domain to the frequency domain using an orthogonal transform such as by a Modified Discrete Cosine Transform (MDCT). The resulting spectral coefficients from the MDCT circuits 123, 124, and 125 are then quantized to provide the compressed signal for recording, transmission or distribution.

Figure 9:
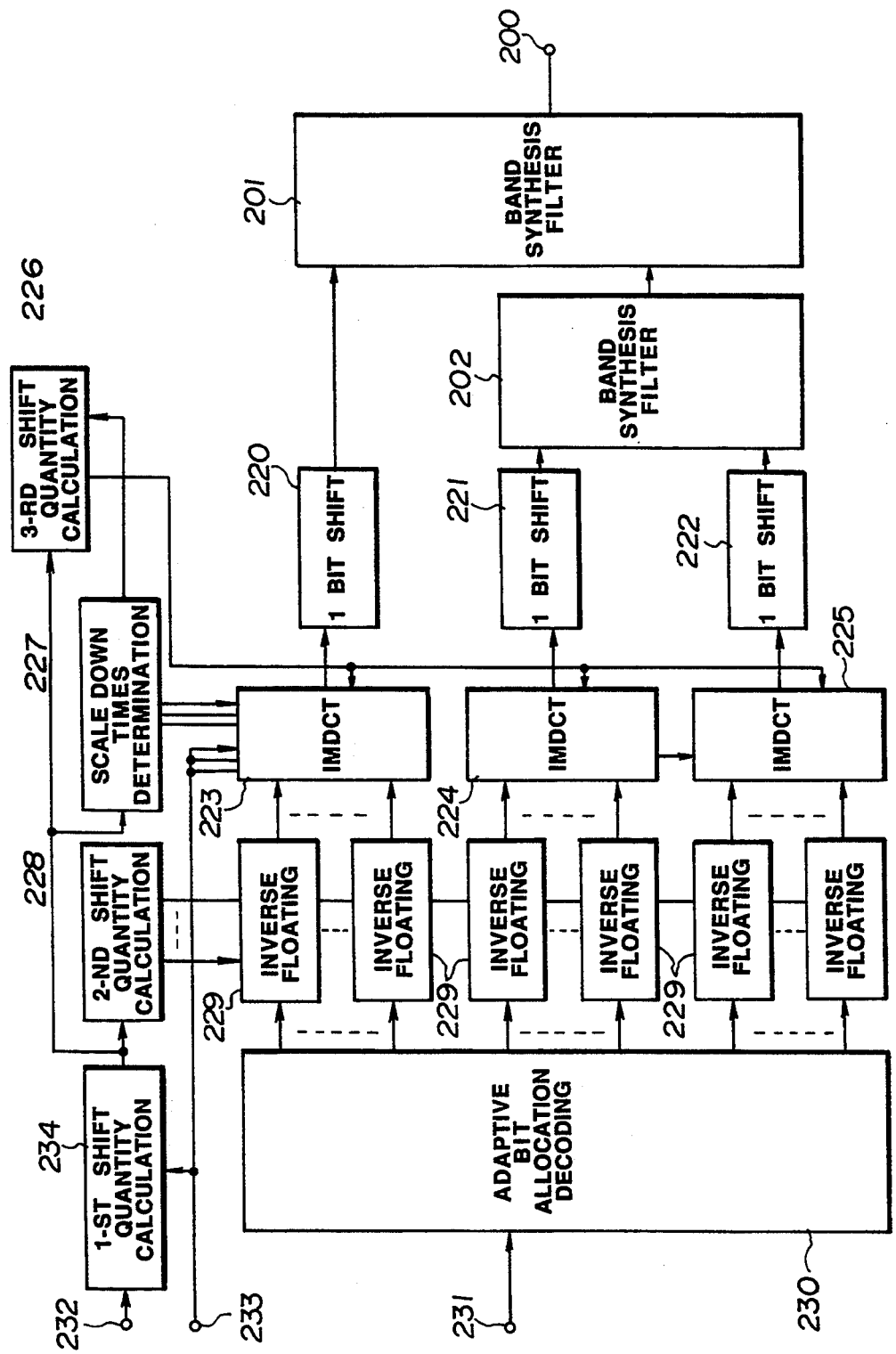
FIG. 9 is a block diagram showing a digital signal expander according to the invention.

The compressed signal is expanded by the expander shown in FIG. 9, in which the quantized spectral coefficients are dequantized by the adaptive bit allocation decoder 230, and the resulting spectral coefficients are orthogonally transformed from the frequency domain to the time domain by the inverse orthogonal transform circuits IMDCT-H circuit 223, IMDCT-M circuit 224, and IMDCT-L circuit 225. The inverse orthogonal transform circuits act as block frequency synthesis circuits which carry out block frequency synthesis by inverse orthogonal transform processing, such as an inverse modified discrete cosine transform (IMDCT) on blocks of spectral coefficients. The frequency range synthesis filters 201 and 202 perform a non-block frequency synthesis on the blocks of samples in the time domain produced by the inverse orthogonal transform circuits to provide the digital output signal to the output terminal 200.

The digital signal processing system according to the invention modifies the noise levels resulting from scale-down operations to take account of noise sensitivity characteristics of the human sense of hearing, such as masking, and the equal loudness characteristic, etc., as will be described later. Also, the noise levels resulting from scale-down operations are reduced in the part of the audio frequency range, particularly in the low frequency range, or in the low and medium frequency ranges, where the noise sensitivity characteristics of the human sense of hearing require the dynamic range to be large. On the other hand, the MDCT and IMDCT operations are simplified in the part of the audio frequency range in which the human sense of hearing is relatively insensitive and does not require a large dynamic range, particularly towards higher frequencies. This enables the scale of the hardware to be reduced.

The digital signal processing system according to the invention implements scale down operations in the MDCT processing in the MDCT circuits 123, 124, and 125, and in the IMDCT processing in the IMDCT-H circuit 223, the IMDCT-M circuit 224, the IMDCT-L circuit 225, and adaptively determines the number of scale down operations by analyzing the values subject to the MDCT and IMDCT processing. The scale down operation is adaptively determined in response to the tonality of the digital input signal.

A scale down operation involves shifting a digital quantity such as a signal sample or a spectral coefficient towards the least significant bit so that when the digital quantity is processed by addition, multiplication, exponentiation, etc., the result of the processing does not cause a numerical overflow in the processing apparatus. For example, if two 16-bit numbers, each having a most significant bit of 1 are added, the result is a 17-bit number. This exceeds the capacity of a 16-bit system and would cause an overflow. If each 16-bit number is shifted one bit to the right, the result of the addition is a 16-bit number that can be accommodated by a 16-bit system. Scale down operations, although preventing overflow, truncate the least significant bits of the shifted quantities, which gives rise to errors. In digital audio systems, the errors can manifest themselves as audible noise, as discussed above.

The digital signal signal processing system according to the invention carries out block floating in the MDCT processing in the MDCT circuits 123, 124, and 125 and carries out scale-down operations in the IMDCT processing in the IMDCT-H circuit 223, IMDCT-M circuit 224, and IMDCT-L circuit 225 to release the block floating applied by the MDCT processing. For example, the block floating is released by carrying out a number of scale down operations in the IMDCT processing corresponding to the magnitude of the block floating. By carrying out the scale down operation in this way, overflow is prevented.

The adaptive scale-down operation may be omitted in the MDCT processing in ones of the MDCT circuits 123, 124, and 125, and in the IMDCT processing in the corresponding ones of the IMDCT-H circuit 223, the IMDCT-M circuit 224, and IMDCT-L circuit 225. Alternatively, the adaptive scale-down operation may only be carried out in the MDCT processing in the one of the MDCT circuits 123, 124, and 125 corresponding to the low-frequency range from the frequency range division filters 101 and 102, and in the IMDCT processing in the corresponding one of the IMDCT-H circuit 223, the IMDCT-M circuit 224, and the IMDCT-L circuit 225.

In the digital signal compressor according to the invention shown in FIG. 1, the lower frequency output of the first frequency range dividing filter 101, which divides the entire audio frequency range into two frequency ranges, is further divided into two frequency ranges by the second frequency range filter 102. The first block floating circuits 120, 121, and 122 respectively apply first block floating processing to the three frequency range signals from the frequency range filters 101 and 102. Then, the MDCT circuits 123, 124, and 125 each perform MDCT processing on one of the block-floating processed frequency range signals. An adaptive scale-down operation is performed in MDCT processing at least one of the lower-frequency frequency range signals. Also, a fixed scale-down operation is performed in MDCT processing the highest-frequency frequency range signal.

After the MDCT processing, second block floating processing, in which the block size is smaller than that of the first block floating processing, is applied to the spectral coefficients produced by the MDCT circuits. The second block floating processed spectral coefficients are then quantized using an adaptively-determined number of bits.

The digital signal expander according to the invention and complementary to the digital signal compressor just described is constructed as shown in FIG. 9. The inverse floating circuits 229 release the second block floating applied to the compressed signal from the above-mentioned digital signal compressor. Then, the IMDCT-L circuit 225 implements IMDCT processing of the spectral coefficients in the low frequency range, during which it adaptively controls the scale-down operation according to the values processed. Further, the IMDCT-M circuit 224, and the IMDCT-H circuit 223 implement IMDCT processing and carry out a fixed scale-down operation on the spectral coefficients in the middle- and high-frequency ranges. The outputs of the IMDCT circuits are then synthesized by the two band synthesis filters 202 and 201.

The block sizes subject to MDCT processing and IMDCT processing in this embodiment are variable, as will be described in more detail below.

For convenience of explanation, the digital signal processing system according to the invention will now be described in more detail as a digital signal compressor and a separate digital signal expander. The digital signal compressor will be described first.

The digital signal compressor provides a useful amount of compression of the digital audio input signal by combining the techniques of adaptive transform coding (ATC), sub-band coding (SBC), and adaptive bit allocation (APC-AB), and will now be described with reference to FIG. 1 and following figures.

In the practical compressor shown in FIG. 1, filters are used to divide the digital audio input signal into a frequency range signal in each of plural frequency ranges having a bandwidth that broadens towards higher frequencies. Each frequency range signal is orthogonally transformed. The resulting spectral coefficients are grouped by frequency into bands to take account of the frequency resolution characteristics of the human sense of hearing, and quantizing bits are adaptively allocated to the bands to quantize the spectral coefficients therein, as will be described below. Bands are critical bands, or bands obtained by dividing higher frequency critical bands further in frequency. Alternatively, the bandwidths of the frequency ranges may be made be equal to one another.

In the compressor according to the invention, the size of the blocks subject to orthogonal transform processing is adaptively varied in accordance with the signal before the orthogonal transform processing, block floating processing is applied to each block.

In FIG. 1, the digital audio input signal is fed into the input terminal 100. The digital audio input signal is, e.g., a PCM audio signal having a frequency range of 0 Hz through 20 kHz. The frequency range division filter 101 divides the digital audio input signal into a frequency range signal in the frequency range of 0 Hz through 10 kHz, and a frequency range signal in the high frequency range of 10 k through 20 kHz. The frequency range division filter 102 further divides the signal in the frequency range of 0 Hz through 10 kHz into a frequency range signal in the low frequency range of 0 Hz through 5 kHz, and a frequency range signal in the middle frequency range of 5 k through 10 kHz. The frequency range division filters 101 and 102 are, e.g., quadrature mirror (QMF) filters. QMF filters are described in R. E. Crochiere, *Digital Coding of Speech in Subbands*, BELL SYST. TECH. J. Vol. 55, No. 8, 1976. A band division technique by equal band width filters is described in Joseph H. Rothweiler, *Polyphase Quadrature Filters—A New Subband Coding Technique*, ICASSP 83, Boston 1983.

The frequency range signal in the high frequency range of 10 k through 20 kHz from the frequency range division filter 101 is first divided into sub blocks 2.5 ms long, and the absolute values of the samples in each sub block are determined. The minimum block shift quantity calculating circuit 103 calculates the logical sums of the absolute values in each sub block. Then, the variable block shift quantity determining circuit 107 calculates the shift quantity of each orthogonal transform block of the high frequency range signal having a block size determined by the orthogonal transform block size determining circuit 106. The variable block shift quantity determining circuit 107 calculates the shift quantity of each orthogonal transform block by comparing the output of the minimum block shift quantity calculating circuit 103 for each sub block in the orthogonal transform block and selecting the minimum output as its output.

Using the output from the variable block shift quantity determining circuit 107 as the block shift quantity, the first block floating circuit 120 applies block floating to the orthogonal transform block of the high frequency range signal. The processed block from the first block floating circuit 120 is sent to the Modified Discrete Cosine Transform (MDCT) circuit 123, which is an example of the orthogonal transform circuit, where it is subject to MDCT processing.

Similarly, the frequency range signal in the middle frequency range of 5 k through 10 kHz from the frequency range division filter 102 is first divided into sub blocks 2.5 ms long, and the absolute values of the samples in each sub block are determined. The minimum block shift quantity calculating circuit 104 calculates the logical sum of the absolute values in each sub block. Then, the variable block shift quantity determining circuit 108 calculates the shift quantity of each orthogonal transform block of the middle frequency range signal, having a block size determined by the orthogonal transform block size determining circuit 106. The variable block shift quantity determining circuit 108 calculates the shift quantity of each orthogonal transform block by comparing the output of the minimum block shift quantity calculating circuit 104 for each sub block in the orthogonal transform block, and selecting the minimum output as its output.

Using the output from the variable block shift quantity determining circuit 108 as the block shift quantity, the first block floating circuit 121 applies block floating to the orthogonal transform block of the middle frequency range signal. The processed block from the first block floating circuit 121 is sent to the MDCT circuit 124, where it is subject to MDCT processing.

Finally, the frequency range signal in the low frequency range of 0 Hz through 5 kHz from the frequency range division filter 102 is first divided into sub blocks 2.5 ms long, and the absolute values of the samples in each sub block are determined. The minimum block shift quantity calculating circuit 105 calculates the logical sum of the absolute values in each sub block. Then, the variable block shift quantity determining circuit 109 calculates the shift quantity of each orthogonal transform block of the low frequency range signal, the block having a block size determined by the orthogonal transform block size determining circuit 106. The variable block shift quantity determining circuit 109 calculates the shift quantity of each orthogonal transform block by comparing the output of the minimum block shift quantity calculating circuit 105 for each sub block in the orthogonal transform block, and selecting the minimum output as its output.

Using the output from the variable block shift quantity determining circuit 109 as the block shift quantity, the first block floating circuit 122 applies block floating to the orthogonal transform block of the low frequency range signal. The processed block from the first block floating circuit 122 is sent to the MDCT circuit 125, where it is subject to MDCT processing.

The above-mentioned Modified Discrete Cosine Transform (MDCT) is described in, e.g., J. P. Princen & A. B. Bradley, *Subband/Transform Coding Using Filter Bank Designs Based on Time Domain Aliasing Cancellation*, ICASSP 1987.

Figure 2:
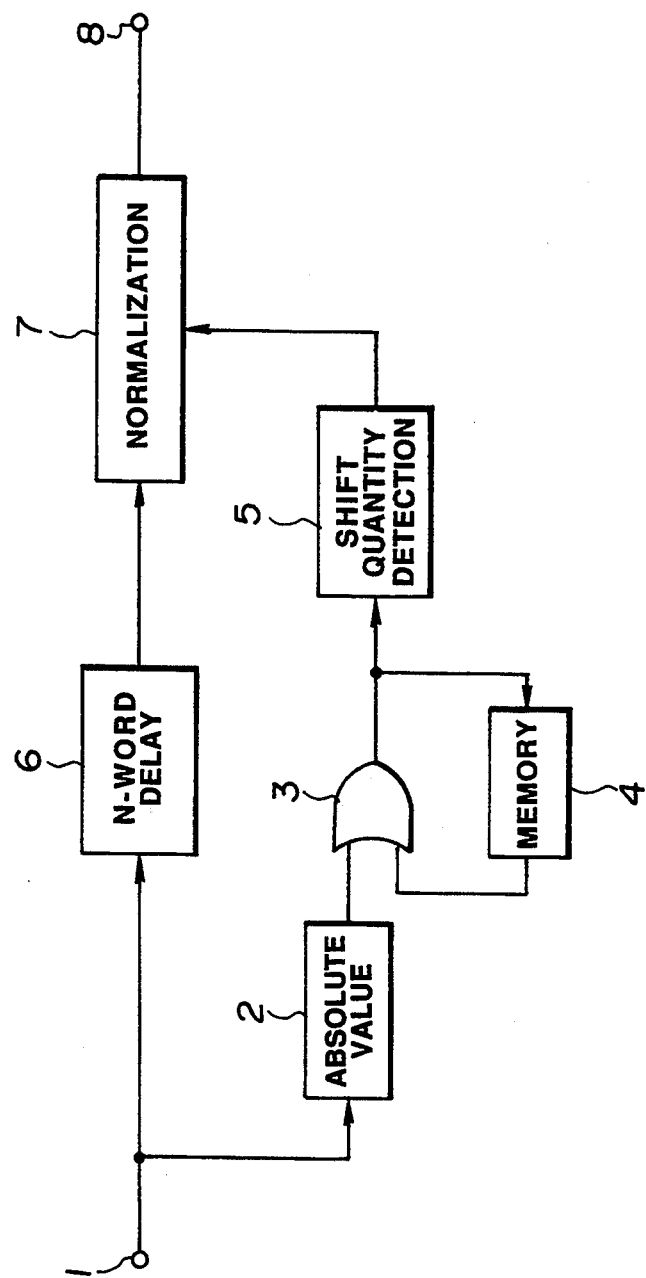
FIG. 2 is a block diagram showing the circuit configuration for carrying out the block floating operation in the apparatus shown in FIG. 1.

The block floating processing operation will now be described with reference to FIG. 2. The input terminal 1 is supplied with one of the frequency range signals from the QMF filters 101 and 102 of FIG. 1. Each orthogonal transform block of the frequency range signal is sent to the absolute value calculating circuit 2, where the absolute value of each sample in the block of the frequency range signal is calculated. The absolute values thus calculated are sent to the logical sum (OR) circuit 3 for determining the shift quantity or the block floating coefficient for the block. The logical sum output from the OR circuit 3 is sent to the memory 4, where it is stored, and read out one clock cycle later and fed back to the OR circuit 3. The OR circuit 3 determines the logical sum of the output from the memory 4 and the absolute value of the next sample from the absolute value calculation circuit 2. The output of the OR circuit 3, which is the logical sum of the present sample and the logical sum of the previous samples, is thus the logical sum of all the samples fed into the OR circuit 3. The memory 4 is reset after all the samples in the block have been fed into the OR circuit 3. As a result, the logical sum of the absolute values of all the samples in the orthogonal transform block is obtained.

The logical sum from the OR circuit 3 is sent to the shift quantity determining circuit 5. The shift quantity determining circuit 5 determines the number of zeroes to the left of the most significant "1" in the logical sum when the logical sum is arranged with the most significant bit (MSB) on the left, or determines the number of left shifts, less one, required to make the Most Significant Bit (MSB) of the logical sum a one.

The values of the respective digits of the logical sum of the absolute values of all the samples in the orthogonal transform block are such that the digit of the logical sum corresponding to a digit that is a "1" in any sample in the block is set to a "1", and the only digits in the logical sum set to "0" are those in which that digit in every sample of the block is a "0". Consequently, successive "0"s at and below the MSB of the logical sum indicate corresponding successive "0"s in each sample in the block. This indicates that the number of significant digits in the logical sum of the absolute values is equal to the number of significant digits of the maximum absolute value in the block. Accordingly, the shift quantity calculated as just described is equal to the shift quantity calculated by determining the maximum absolute value in the block.

The orthogonal transform block of the frequency range signal from the input terminal 1 is also fed to the normalizing circuit 7 via the delay circuit 6, which delays the frequency range signal by the processing time required to determine the shift quantity for the block. The shift quantity from the shift quantity determining circuit 5 is also fed into the normalizing circuit 7. The normalizing circuit 7 carries out normalizing or block floating processing by shifting each sample in the orthogonal transform block by the shift quantity from the shift quantity determining circuit 5. After this operation, the number of bits in each sample may be truncated to a fixed number of higher-order bits using, e.g., a requantizer, etc. The block of the block floating processed frequency range signal is fed out from the normalizing circuit 7 via the output terminal 8.

Figure 3:
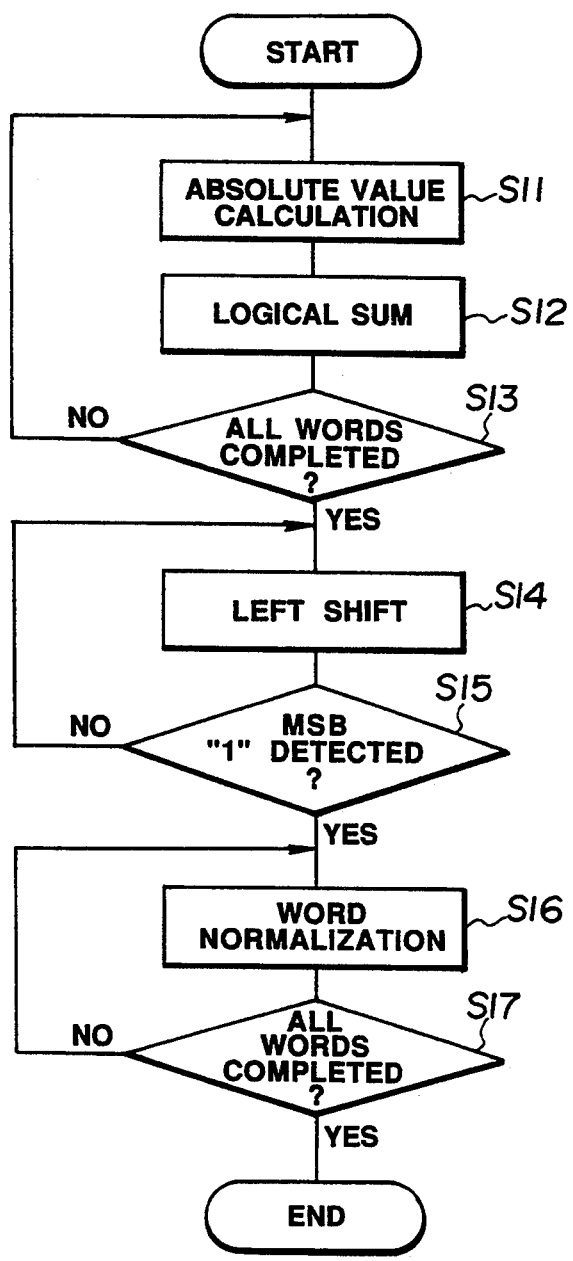
FIG. 3 is a flow chart of a program for realizing the block floating operation of the circuit configuration shown in FIG. 2.

FIG. 3 is a flow chart showing a procedure for realizing block floating processing by running a program on a computer or digital signal processor. At step S11, which corresponds to the absolute value calculating circuit 2, the absolute value of each sample in the block is calculated. At step S12, a logical sum operation is performed on each absolute value of the samples in the block in a manner similar to the OR circuit 3. At step S13, it is determined whether or not the logical sum of the absolute values of all the samples in the block has been determined. When it is determined that the logical sum of the absolute values of all the samples in the block has not been determined (NO), processing returns to step S11. On the other hand, when it is determined that the logical sum of the absolute values of all the samples in the block has been determined (YES), processing proceeds to the subsequent step S14.

Steps S14 and S15 correspond to the operations in the shift quantity determining circuit 5. At the step S14, a left shift is carried out. At step S15, it is detected whether the most significant bit (MSB) of the shifted result is a "1". When a "1" is not detected as the MSB at step S15 (NO), processing returns to step S14. On the other hand, when a "1" is detected as the MSB at step S15 (YES), processing proceeds to step S16. Steps S16 and S17 correspond to the normalizing circuit 7. At step S16, one sample in the block is normalized. At step S17, it is determined whether all of the samples in the block have been normalized. When the result is NO, processing returns to step S16. On the other hand, when the result is YES, indicating that all the samples in the block have been normalized, the block floating processing for the block terminates.

The digital signal compressor according to the invention does not use complicated processing to detect the maximum absolute value in a block of samples, as in the prior art. Instead simple processing, involving only determining the logical sum of the absolute values of the samples in the block, is carried out. This makes it possible to determine the shift quantity or block floating coefficient for each orthogonal transform block in a simple manner, which reduces the number of steps required to perform the block floating processing using software, such as a microprogram, run on a digital signal processor. The reduction in the number of steps permits the processing to be performed at higher speed.

Figure 4:
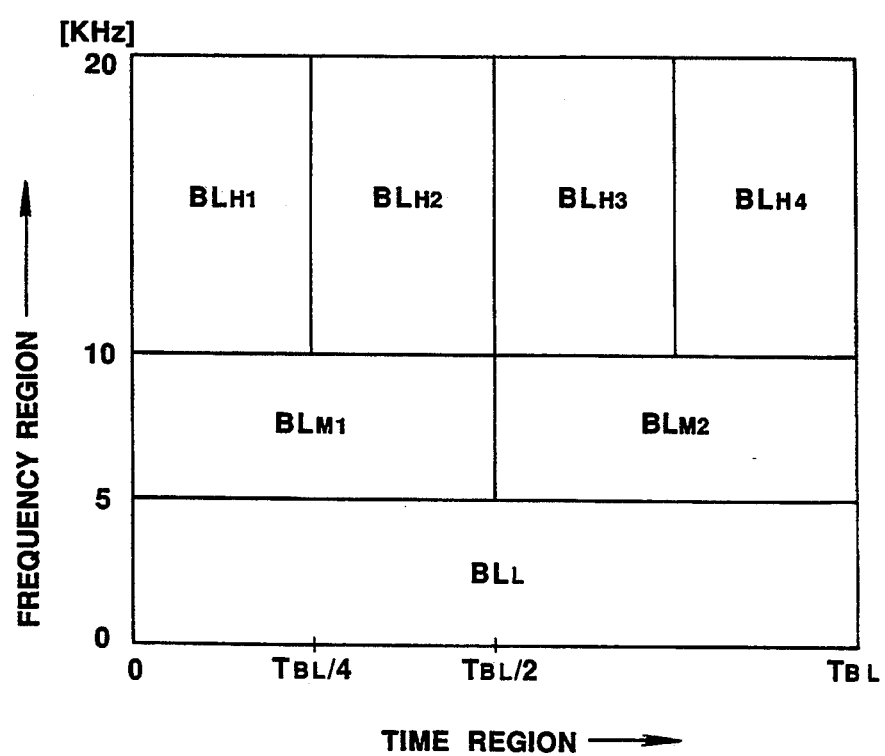
FIG. 4 shows a practical example of how the digital audio input signal is divided into a frequency range signal in each of plural frequency ranges, and how each frequency range signal is divided in time into blocks of plural samples in the apparatus shown in FIG. 1.

A practical example showing how the digital audio input signal is divided into frequency range signals in each of plural frequency ranges, and how the frequency range signals are divided in time into blocks for processing by the respective MDCT circuits 123, 124, 125 of FIG. 1, is shown in FIG. 4. In the practical example shown in FIG. 4, the bandwidth of the frequency ranges is made broader towards higher frequencies, and the block length is made shorter. This reduces the frequency resolution and increases the time resolution towards higher frequencies.

In the low frequency range of 0 Hz through 5 kHz, the size of the orthogonal transform block BLL is set to include, e.g., 256 samples, with a duration of TBL. In the middle frequency range of 5 k through 10 kHz, the frequency range signal is divided in time into two orthogonal transform blocks BLM1 and BLM2, each having a duration of TBL/2, one half of that of the block BLL in the low frequency range. In high frequency range of 10 k through 20 kHz, the frequency range signal is divided into four orthogonal transform blocks BLH1, BLH2, BLH3, BLH4, each having a duration of TBL/4, one forth of that of the block BLL in the low frequency range.

When the frequency range of the digital audio input signal extends from 0 Hz to 22 kHz, the low frequency range extends from 0 Hz to 5.5 kHz, the middle frequency range extends from 5.5 k to 11 kHz, and the high frequency range extends from 11 k to 22 kHz.

The operation of the orthogonal transform block size determining circuit 106 will now be described with reference to FIG. 1. Every 2.5 ms, the orthogonal transform block size determining circuit 106 receives from the minimum block shift quantity calculating circuits 103, 104, and 105 the shift quantity for a 2.5 ms-long sub block, and compares the shift quantities in blocks 20 ms long. If, in a block of shift quantities, the shift quantity decreases by, e.g., 4 bits or more, this indicates to the circuit 106 that there has been a sudden increase of the amplitude of the input signal. In such an event, the orthogonal transform block size should be reduced to one half or one fourth. The block size determined by the orthogonal transform block size determining circuit 106 is delivered to the variable block shift quantity determining circuits 107, 108, and 109, and to the first block floating circuits 120, 121, and 122. The orthogonal transform block size may be changed independently in each frequency range, or all the orthogonal transform block sizes may be changed in common. Block size information, indicating the orthogonal transform block sizes, also fed to the output terminal 133.

The spectral coefficients in the frequency domain that result from MDCT processing each block of the first block-floating processed frequency range signals by the respective MDCT circuits 123, 124, and 125 are grouped by frequency into bands, to which the second block floating circuits 129 apply second block floating processing. The bands to which second block floating processing is applied correspond to critical bands, or to bands obtained by dividing higher-frequency critical bands further in frequency. Also, while the block floating resolution may also be 6 dB, the number of samples within each band to which the second block floating is applied may be made smaller than the number of samples in the block to which the first block floating is applied, to make it possible to carry out block floating with a finer resolution than 6 dB. This allows the gain of the block floating to be large, and provides a large increase in compression efficiency. In the preferred embodiment, second block floating with a resolution of about 1.8 dB is carried out.

The first and second block floating quantities are not separately delivered to the expander, to be described below. Instead, the total of the first and second block floating quantities is calculated by the block floating total quantity calculating circuit 128, and a block of block floating totals for each orthogonal transform block is fed to the output terminal 132.

The bands of spectral coefficients which have been subject to second block floating are sent to the adaptive bit allocation circuit 130.

A critical band is a frequency band that takes account of the frequency resolution characteristics of the human sense of hearing, and is the bandwidth of a narrow band of noise that is masked by a pure sound having the same intensity as that of the noise, and a frequency in the middle of the band of noise. The bandwidth of the critical bands increases with increasing frequency. The audio frequency range extending from 0 Hz to 20 kHz is divided into, e.g., 25 critical bands.

The allowed noise calculation circuit 127 calculates an allowed noise level for each critical band, taking account of masking, in response to the spectrum of the digital audio input signal divided into critical bands. From the allowed noise level and the energy or the peak level in each band, the number of bits to be allocated for quantizing the spectral coefficients in the band is calculated. A band is a critical band, or a band obtained by dividing a higher-frequency critical band further in frequency. The adaptive bit allocation circuit 130 requantizes the spectral coefficients in each band using the number of quantizing bits allocated to the band. The resulting quantized spectral coefficients are fed to the output terminal 131.

The allowed noise calculating circuit 127 will now be described in more detail. The spectral coefficients generated by the MDCT circuits 123, 124, and 125 are obtained by orthogonally transforming the frequency range signals subjected to first block floating by the block floating circuits 120 through 122. Since the allowed noise levels to be calculated by the allowed noise calculating circuit 127 must be calculated using original signals, the allowed noise levels should not be calculated using spectral coefficients derived from frequency range signals subject to first block floating. Accordingly, the first block floating applied by the first block floating circuits 120 through 122 is released by feeding the spectral coefficients into the block floating release circuit 126. Consequently, the allowed noise level calculating circuit 127 calculates the allowed noise levels from the spectral coefficients shifted using block shift quantities fed into the block floating release circuit 126 from the variable shift quantity determining circuits 107, 108, and 109.

Figure 5:
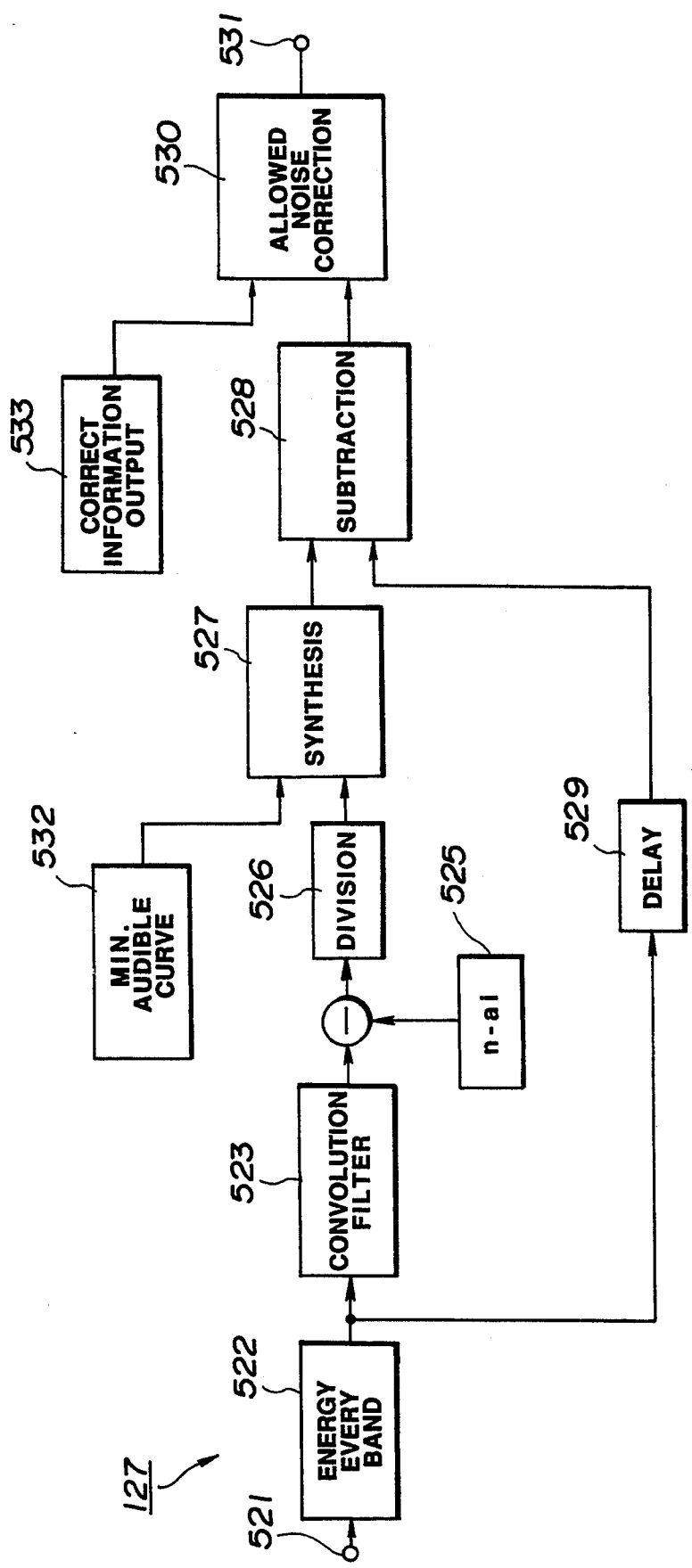
FIG. 5 is a block diagram showing a practical example of the allowed noise calculating circuit 127 in the apparatus shown in FIG. 1.

FIG. 5 is a block diagram showing the configuration of a practical example of the above-mentioned allowed noise level calculating circuit 127. In FIG. 5, spectral coefficients from the block floating release circuit 126 are fed to the input terminal 521.

The spectral coefficients are fed to the energy calculating circuit 522, which calculates the energy in each band by, for example, calculating the total of the respective amplitude values of the spectral coefficients in the band, or by other methods. Instead of calculating the energy of each band, the peak value or the mean value, etc. of the amplitudes of the spectral coefficients in the band may be used.

Figure 6:
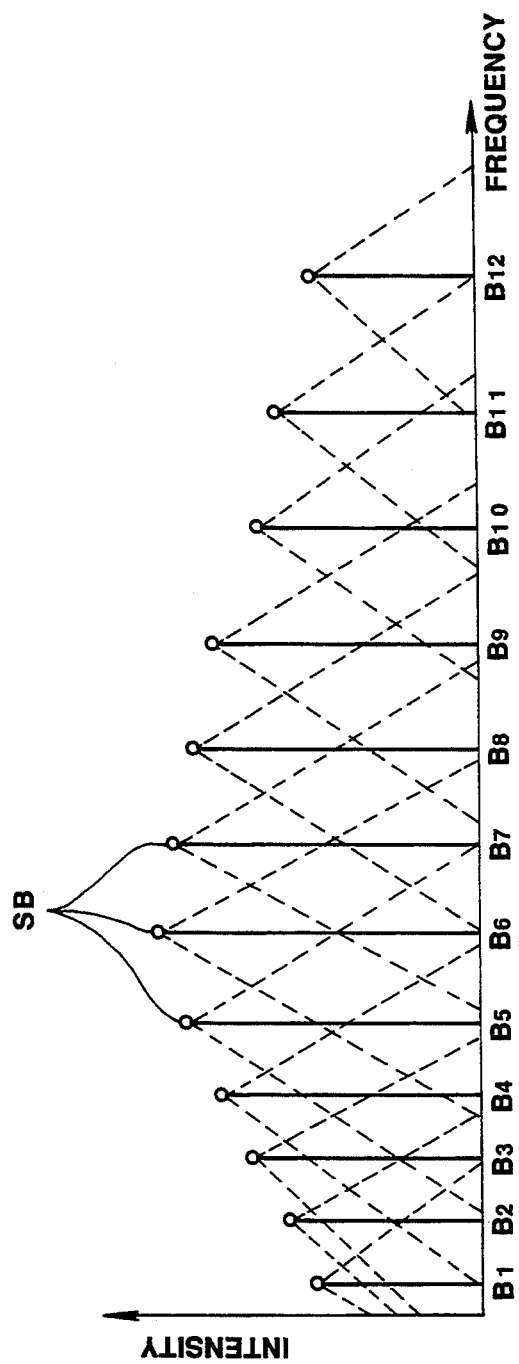
FIG. 6 shows a bark spectrum.

The energy calculating circuit 522 provides as its output a spectrum of the energy of each band, which is generally called a bark spectrum. FIG. 6 shows a typical bark spectrum SB, in which only 12 critical bands (B1 through B12) are shown to simplify the drawing.

To calculate the masking effect of the bark spectrum SB generated by the energy calculating circuit 522, convolution processing is performed to multiply each component of the bark spectrum SB by a predetermined weighting function, and to sum the resulting products. The output of the energy calculating circuit 522, i.e., the components of the bark spectrum SB, is fed to the convolution filter 523. The convolution filter 523 comprises, e.g., plural delay elements for sequentially delaying the output of the energy calculating circuit 522, plural multipliers (e.g., 25 multipliers, one for each critical band) for multiplying the output of each delay element by a weighting function, and a summing circuit for summing the multiplier outputs. This convolution processing derives the sum of the portions indicated by dotted lines in FIG. 6.

Masking is a characteristic of the human sense of hearing in which one signal can render another signal (or noise) inaudible. The signal (or noise) that is rendered inaudible is said to be "masked" by the other signal. Masking can take place in the time domain, in which a signal (or noise) is masked by another signal occurring before or after the signal (or noise). Masking can also take place in the frequency domain, in which a signal (or noise) is rendered inaudible by a signal having a different frequency. As a result of masking, noise that is masked cannot be heard. Hence, noise within the masking range of the audio signal can be regarded as allowable noise.

A practical example of the weighting functions in the convolution filter 523 will now be given. When the coefficient of the multiplier M corresponding to an arbitrary band is 1, the outputs of the multipliers $M-1$, $M-2$, and $M-3$ are respectively multiplied by weighting functions of 0.15, 0.0019, and 0.0000086; and the outputs of the multipliers $M+1$, $M+2$, and $M+3$ are respectively multiplied by weighting functions of 0.4, 0.06, and 0.007. M is an arbitrary integer between 1 and 25.

The output of the convolution filter 523 is fed into the subtractor 524, which calculates a level $\alpha$ corresponding to the allowable noise level (which will be described later) in the above-mentioned convoluted region. The level $\alpha$ corresponding to the allowable noise level is the level that will become equal to the allowed noise level in each critical band after inverse convolution processing is carried out, as will be described below. The subtractor 524 is supplied with an allowed function for calculating the level $\alpha$. Increasing or decreasing the value of the allowed function controls the level $\alpha$. The allowed function is supplied by the $(n-ai)$ function generator 525, as will be described next.

When the number of the band is i, the number of the lowest-frequency band being 1, the level $\alpha$ corresponding to the allowed noise level is calculated using the following formula (A):

$$\alpha = S - (n - ai) \qquad (A)$$

In the formula (A), n and a are constants (a>0), and S is the intensity of the convolution-processed bark spectrum. In the formula (A), $(n-ai)$ is the term indicating the allowed function. In the preferred embodiment, degradation of the sound quality is avoided by setting n to 38 and a to 1.

The level $\alpha$ is fed to the divider 526, which provides inverse convolution processing to the level $\alpha$ in the convoluted region. Accordingly, by carrying out inverse convolution processing, the masking threshold is obtained from the level $\alpha$. The masking threshold in each band provides the allowed noise spectrum. It is to be noted that while the above-mentioned inverse convolution processing normally requires complicated processing, in the preferred embodiment, satisfactory inverse convolution processing is carried out by using simple divider 526.

Figure 7:
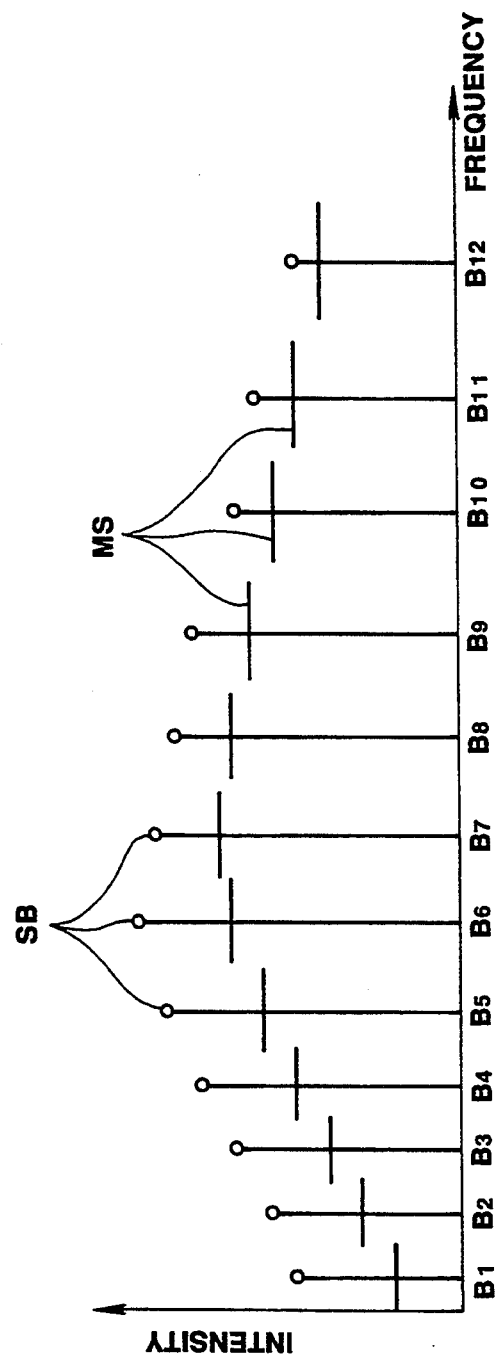
FIG. 7 shows a masking spectrum.

The masking threshold is transmitted to the subtractor 528 through the synthesis circuit 527. The subtractor 528 also receives the output of the energy calculating circuit 522, i.e., the bark spectrum SB, via the delay circuit 529. The subtractor 528 subtracts the masking threshold from the bark spectrum SB, and levels below the level indicated by the masking threshold MS of the bark spectrum SB are masked, as shown in FIG. 7.

The output of the subtractor 528 is fed via the allowed noise correction circuit 530 and the output terminal 531 to a ROM (not shown), in which, e.g., pre-allocated bit number information is stored. In response to the difference between the energy in each band and the allowed noise level for the band obtained via the allowed noise correction circuit 530 from the subtractor 528, the ROM reads out an allocated bit number for each band. The allocated bit numbers are fed to the adaptive bit allocation circuit 130, where the spectral coefficients from the MDCT circuits 123, 124, and 125 in each band are quantized using the allocated bit number for the band.

To summarize, the adaptive bit allocation circuit 130 quantizes the spectral coefficients in each band using the number of bits allocated in accordance with the difference between the energy or peak value in the band and the allowed noise level for the band.

The delay circuit 529 is provided for delaying the bark spectrum SB from the energy calculating circuit 522 to take account of the delays in the circuits preceding the synthesis circuit 527.

Figure 8:
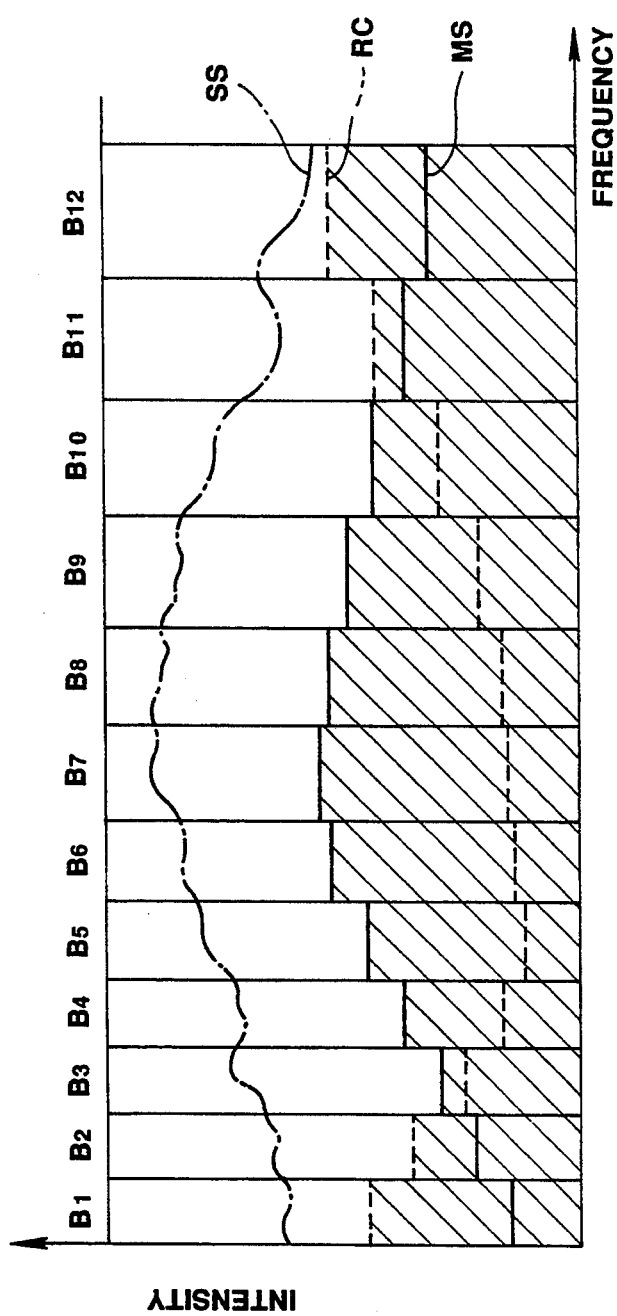
FIG. 8 shows a curve obtained by synthesizing the minimum audible level curve and the masking spectrum.

The synthesis circuit 527 synthesizes the masking threshold MS and data indicating the so-called minimum audible level curve RC, which characterizes another characteristic of the human sense of hearing. This synthesis is depicted in FIG. 8. The data indicating the minimum audible level curve are provided by the minimum audible level curve generator 532. According to the minimum audible level curve, when the absolute noise level is below the minimum audible level curve, the noise cannot be heard. The minimum audible curve varies, depending upon, e.g., the acoustic level at which the signal is reproduced. However, in a practical digital audio system, there are not great differences in the ways in which the dynamic range of music can be fit into, e.g., the dynamic range provided by a 16-bit digital system. Accordingly, if the quantizing noise level in the frequency band in which the ear is most sensitive, i.e., in the vicinity of 4 kHz, is inaudible, it can be assumed that quantizing noise below the level of the minimum audible level curve cannot be heard in other frequency bands.

Accordingly, on the assumption that a way of use is employed such that, e.g., the noise level produced in the vicinity of 4 kHz by the word length that the system has is inaudible, when the minimum audible curve RC and the masking threshold MS are synthesized to provide the allowed noise level, the allowed noise level can be as high as the shaded portion in FIG. 8. It is to be noted that, in this embodiment, the level at 4 kHz of the minimum audible level curve is set to correspond to the minimum level corresponding to quantizing using, e.g., 20 bits. The signal spectrum SS is also shown in FIG. 8.

The allowed noise correction circuit 530 corrects the allowed noise level at the output of the subtractor 528 using, e.g. , the equal-loudness curve sent provided by the correction information output circuit 533. The equal-loudness curve is a yet another characteristic of the human sense of hearing. The equal-loudness curve characterizes the sound pressure levels of sounds at various frequencies that are heard with the same intensity as that of a pure sound of 1 kHz. The equal-loudness curve is substantially similar to the minimum audible level curve RC, shown in FIG. 8. According to the equal-loudness curve, for example, a sound in the vicinity of 4 kHz sounds as loud as a sound at 1 kHz sound having a sound pressure level about 8 to 10 dB higher. On the other hand, a sound at about 50 Hz must have a sound pressure level about 15 dB higher than the sound at 1 kHz to sound as loud.

It is desirable that noise above the level of the allowed noise level have a frequency characteristic given by a curve corresponding to the equal-loudness curve. Correcting the allowed noise level to take account of the equal-loudness curve further takes account of the characteristics of the human sense of hearing.

The correction information output circuit 533 may also be constructed to correct the allowed noise level in response to information indicating the difference between the number of bits used for quantizing by the quantizing circuit 130 (FIG. 1) and the target bit rate of the compressed digital signal. This is required because an error may exist between the total number of bits allocated by an advance temporary adaptive bit allocation among the bands and the number of bits indicated by the target bit rate of the compressed digital signal. Therefore, the bit allocation must be repeated to reduce the error to zero. The second bit allocation is carried out such that, when the total number of allocated bits is less than the target value, a number of bits equal to the difference is distributed among the bands to add to the bits already allocated. On the other hand, when the total number of allocated bits is greater than the target value, a number of bits equal to the difference is removed from the bits already allocated among the bands.

To carry out this operation, the error between the target value and the total number of allocated bits is detected. The correction information output circuit 533 the generates correction data for correcting the allowed noise level to change the allocated bit numbers in response to the error. When the error indicates shortage of the number of allocated bits, a greater number of bits must be used per band. On the other hand, when the error indicates an excess in the number of allocated bits, fewer bits must be used per band.

Accordingly, the correction information output circuit 533 provides to the allowed noise level correction circuit 530 a correction value for correcting the allowed noise level from the output of the subtractor 528, e.g., according to the equal-loudness curve, and the bit allocation error. Thus, the allowed noise level from the subtractor 528 is corrected.

In an alternative embodiment, the number of bits corresponding to the target value may be allocated among the bands according to a fixed bit allocation pattern. This considerably reduces the number of operations required for the bit allocation. As a further alternative, bit allocation depending upon the magnitudes of the signals in the respective bands may be carried out so that noise energy can be minimized.

The quantized spectral coefficients from the output terminal 131, the block of block floating totals from the output terminal 132, and the orthogonal transform block size from the output terminal 133 are normally multiplexed by a multiplexer (not shown) to produce a recording signal for recording on a recording medium, transmission, or distribution.

A digital signal expander according to the invention will now be described with reference to FIG. 9 and following figures. The recording signal reproduced from a recording medium, or received via transmission or distribution, would normally be demultiplexed by a demultiplexer (not shown) to separate the quantized spectral coefficients, which are fed to the input terminal 231, the block of block floating totals, which is fed to the input terminal 232, and the orthogonal transform block size which is fed to the input terminal 233. Alternatively, these inputs may be received directly from the output terminals 131,132, and 133, respectively, of the compressor.

In FIG. 9, the quantized spectral coefficients are fed from the input terminal 231 to the adaptive bit allocation decoding circuit 230, where the adaptive bit allocation made in the compressor is reversed. Then, the resulting spectral coefficients are fed to the inverse block floating circuits 229, where the second block floating applied in the compressor is reversed. The inverse floating circuits 229 process the spectral coefficients grouped by frequency into bands, which are critical bands, or bands obtained by dividing higher-frequency critical bands further in frequency. The shift quantity used for reversing the second block floating is calculated as follows.

The block of block floating totals is fed from the input terminal 232 to the first shift quantity calculating circuit 234. The first shift quantity calculating circuit 234 determines the first block floating quantity by determining the minimum of the block floating totals in the block of block floating totals. The minimum block floating total provides the first block floating quantity of the orthogonal transform block, and has a resolution of 6 dB (1 bit).

The second shift quantity calculating circuit 228 calculates from the block floating totals in the block of block floating totals the second block floating quantity for each band of spectral coefficients resulting from transforming the orthogonal transform block. The second shift quantity calculating circuit 228 subtracts the first block floating quantity calculated by the first shift quantity calculating circuit 234 from each block floating total in the block of block floating totals. The resulting differences provide the second block floating quantity for each band of spectral coefficients.

The orthogonal block size is fed from the input terminal 233 to the first shift quantity calculation circuit 234, and to the IMDCT-H circuit 223 that will inversely transform the higher-frequency spectral coefficients, the IMDCT-M circuit 224, that will inversely transform the middle-frequency spectral coefficients, and the IMDCT-L circuit 225, that will inversely transform the low-frequency spectral coefficients to generate frequency range signals in the high-frequency range, the middle-frequency range, and the low-frequency range, respectively.

In this embodiment, the processing method in the IMDCT-H circuit 223 and the IMDCT-M circuit 224 in the middle- and high-frequency ranges is made different from the processing method in the IMDCT-L circuit 225 in the low-frequency range. This causes the respective operational accuracies to be different.

First, the IMDCT-H circuit 223 and the IMDCT-M circuit 224 will be described. The second block floating applied to the bands of spectral coefficients is released by the inverse block floating circuits 229 using the second block floating quantities calculated by the second shift quantity calculating circuit 228. The resulting spectral coefficients are then inversely orthogonally transformed by the IMDCT-H circuit 223 and IMDCT-M circuit 224. This reverses the orthogonally transformed state of the compressed signal, and generates blocks of time-domain samples of frequency range signals in the high-frequency range and the middle frequency range.

In the IMDCT processing carried out in the IMDCT-H circuit 223 and the IMDCT-M circuit 224, a scale-down operation corresponding to the output of the scale-down times determination circuit 227, which will be described below, is implemented. Also, the resulting scaled down blocks of frequency range signal samples from the IMDCT circuits are further shifted in response to a third shift quantity from the third shift quantity calculating circuit 226, which will be described below, and are then shifted by one more bit to reduce their scale by ½, before being fed to the synthesis filters 201 and 202.

The scale down times determination circuit 227 determines the number of scale down times (i.e., the number of shifts towards the least significant bit, or right shifts) in the IMDCT-H circuit 223 and in the IMDCT-M circuit 224 in response to the output of the first shift quantity calculating circuit 234.

The third shift quantity calculating circuit 226 calculates the third shift quantity from the first shift quantity and the scale down times determined by the scale down times determination circuit 227, and delivers the third shift quantity to the IMDCT-H circuit 223 and the IMDCT-M circuit 224. The third shift quantity is the shift quantity that sets the scale of the outputs of the IMDCT-H circuit 223 and of the IMDCT-M circuit 224 to one half of the normal scale, i.e., the outputs of the IMDCT-H circuit and the IMDCT-M circuit are shifted by one bit towards the least significant bit.

The operation of the scale down determining circuit 227, the third shift quantity calculating circuit 226, the IMDCT-H circuit 223, and the IMDCT-M circuit 224 will now be described in detail by using an example of the IMDCT calculating technique. The IMDCT calculation procedure will be first described. An IMDCT calculated by the following formula (1). The IMDCT can be calculated at high speed by using, e.g., a Fast Fourier Transform (FFT).

$$y(n) = \sum_{n=0}^{M-1} X_1(k)\cos\left(\frac{\pi(2k+1)(2n+M+1)}{4M}\right), 0 \leq n \leq 2M \quad (1)$$

The procedure for carrying out this calculation is shown below:

First, $U(k)$ is defined by the following formula (2):

$$U(k) = X(2k), 0 \leq k < M/2 = \quad (2)$$
$$-X(2M - 1 - 2k), M/2 \leq k < M$$

From the above formula (2), complex series $Z(l)$ is calculated by transform operation expressed by the following formula (3):

$$Z(l) = (U(2l) + iU(2l+1))\exp(-i2\pi l/M), 0 \leq l < M/2 \quad (3)$$

In actual terms, a calculation to develop the complex number into the real number is carried out as indicated by the following formula (4):

$$Re[Z(l)] = U(2l)\cos(-2\pi l/M) - U(2l+1)\sin(-2\pi l/M)$$

$$Im[Z(l)] = U(2l+1)\cos(-2\pi l/M) + U(2l)\sin(-2\pi l/M), 0 \leq l < M/2 \quad (4)$$

Here, a FFT is applied to $z(l)$ according to formula (5) to provide $z(n)$:

$$z(n) = \sum_{l=0}^{M/2-l} Z(l)\exp\left(-j\frac{2\pi nl}{(M/2)}\right), 0 \leq n \leq \frac{M}{2} \quad (5)$$

In calculating the FFT, e.g., the generally well known Cooley-Tukey algorithm is used to implement the N stages ($2^N = M/2$) of the butterfly operation to $Z(l)$.

A transfer operation indicated by formula (6) is applied to the output $z(n)$ of the FFT to provide $u(n)$.

$$u(n) = a_{0,n}Re[z(n)] + a_{1,n}Re[z(M/2-1-n)] + a_{2,n}Im[z(n)] + a_{3,n}Im[z(M/2-1-n)]$$

$$u(M-1-n) = a_{2,n}Re[z(n)] - a_{3,n}Re[z(M/2-1-n)] - a_{0,n}Im[z(n)] + a_{1,n}Im[z(M/2-1-n)],$$
$$0 \leq n < M/2 \quad (6)$$

In formula (6), conditioning indicated by formula (7) is implemented:

$$a_{0,k} = (\tfrac{1}{2})(\cos(\pi(2k+1)))/4M - \sin(5\pi(2k+1)/4M)$$

$$a_{1,k} = (\tfrac{1}{2})(\cos(\pi(2k+1)))/4M + \sin(5\pi(2k+1)/4M)$$

$a_{2,k}=(\frac{1}{2})(\sin(\pi(2k+1)))/4M+\cos(5\pi(2k+1)/4M)$ $a_{3,k}=(\frac{1}{2})(-\sin(\pi(2k+1)))/4M+\cos(5\pi(2k+1)/4M)$ (7)

Then, u(n) is sequenced as shown below to expand it to the length 2M to obtain y(n) as indicated by formula (8):

$$\begin{aligned} y(n) &= u(n + M/2), 0 \leq n < M/2 \\ &= -u(3M/2 - 1 - n), M/2 \leq n < 3M/2 \\ &= -u(n - 3M/2), 3M/2 \leq n < 2M \end{aligned} \quad (8)$$

The relationship between the number of scale down times determined by the scale down times determining circuit 227 and the IMDCT processing will now be described. To prevent the overflows described above in connection with the drawbacks of the prior art in the operation of the IMDCT circuits shown in FIG. 9, the operational accuracy of the IMDCT is scaled down. For example, the spectral coefficients subject to IMDCT processing are shifted towards the least significant bit by a number of places equal to the scale down times amount. This prevents overflow at the expense of lowering the operational accuracy, since less significant bits are lost as a result of the right shift. If the operational accuracy is excessively lowered, the sound obtained when the digital output signal is reproduced will be offensive to the ear. For this reason, scaling down is carried out gradually, and only to the extent required to prevent an overflow, to reduce the possibility that the resulting sound quality will be offensive to the ear.

Depending on the number of scale down times, scaling down in selectively applied to the above formulas (4), (5) and (6). One scale down operation is applied to each of the formulas (4) and (6), whereas N scale down operations are applied to formula (5), because this formula is applied to the N stages of the butterfly operation.

The scale down varies depending on the first shift quantity. Accordingly, the maximum number of scale down operations (maximum scale down times) is determined by the number of stages in the butterfly operation, i.e., on the block length M to which the IMDCT is applied. When the maximum number of scale down times is indicated by MSD, the maximum number of scale down times MSD is expressed by formula (9), in which N indicates the number of stages of the butterfly operation.

$$\begin{aligned} MSD &= 1 + N + 1 \\ &= N + 2 \end{aligned} \quad (9)$$

Hence, for example, when the block length M is 128, the number of stages N of the butterfly operation is 6, and the maximum scale down times MSD is 8 from formula (9). Therefore, there is no possibility that the number of scale down operations determined by the scale down times determining circuit 227 is greater than 8.

If the first shift quantity generated by the first shift quantity calculating circuit 234 is indicated by IBF1, the number of scale down operations is indicated by ISD, and the maximum number of scale down operations is indicated by MSD, the number of scale down times can be expressed by formula (10):

$ISD = 1 \ (IBF1 < 0)$ $ISD = IBF1 + 1 (0 \leq IBF1 < MSD)$ $ISD = MSD (IBF1 \geq MSD)$ (10)

When the first shift quantity IBF1 is a positive number, this indicates the shift quantity towards the most significant bit; whereas, when the first shift quantity IBF1 is a negative number, this indicates the shift quantity towards the least significant bit in terms of the absolute value of IBF1.

When the number of scale down operations is 1, scale down is implemented by the quantity indicated by formula (4). Every time the value of the number of scale down operations ISD is increased by 1, scale down is implemented in formula (5), first to the first stage and then to the second stage.

The third shift quantity calculating circuit 226 will now be described. The third shift quantity is the shift quantity that sets the scale of the result of processing formula (8) to be equal to one half of the normal scale, i.e., the result of processing formula 8 is shifted one bit towards the least significant bit. The reason why the result of processing formula (8) is scaled down by $\frac{1}{2}$ is to prevent an overflow, and to provide a margin of one bit towards the most significant bit.

The third shift quantity will be indicated by IBF3. When the third shift quantity IBF3 is a positive number, this indicates the shift quantity towards the least significant bit, i.e., a right shift, whereas when the third shift quantity IBF3 is a negative number, this indicates the shift quantity towards the most significant bit, i.e., a left shift, in terms of the absolute value of IBF3.

The relationship between the first shift quantity IBF1, the number of scale down operations ISD, and the third shift quantity IBF3 can be expressed by the following formula (11):

$$IBF1 - ISD - IBF3 = -1 \quad (11)$$

In formula (11), block floating corresponding to the first shift quantity IBF1 is released by the number of scale down operations ISD and the third shift quantity IBF3. The scale of each sample at the output of the IMDCT indicates uniformly $-1$, i.e., that it is has been shifted by one bit towards the least significant bit.

The relationship between the first shift quantity IBF1, the number of scale down operations ISD, and the third shift quantity IBF3 when, e.g., the IMDCT block length M is 128, and the number of butterfly stages in the FFT is 6 is as shown in Table 1. In Table 1, an asterisk (*) indicates that scale down is implemented. From Table 1, and also when the first shift quantity IBF1 takes values other than those indicated in Table 1, the number of scale down times ISD and the third shift quantity IBF3 are determined in accordance with the above-mentioned rule.

Figure 10:
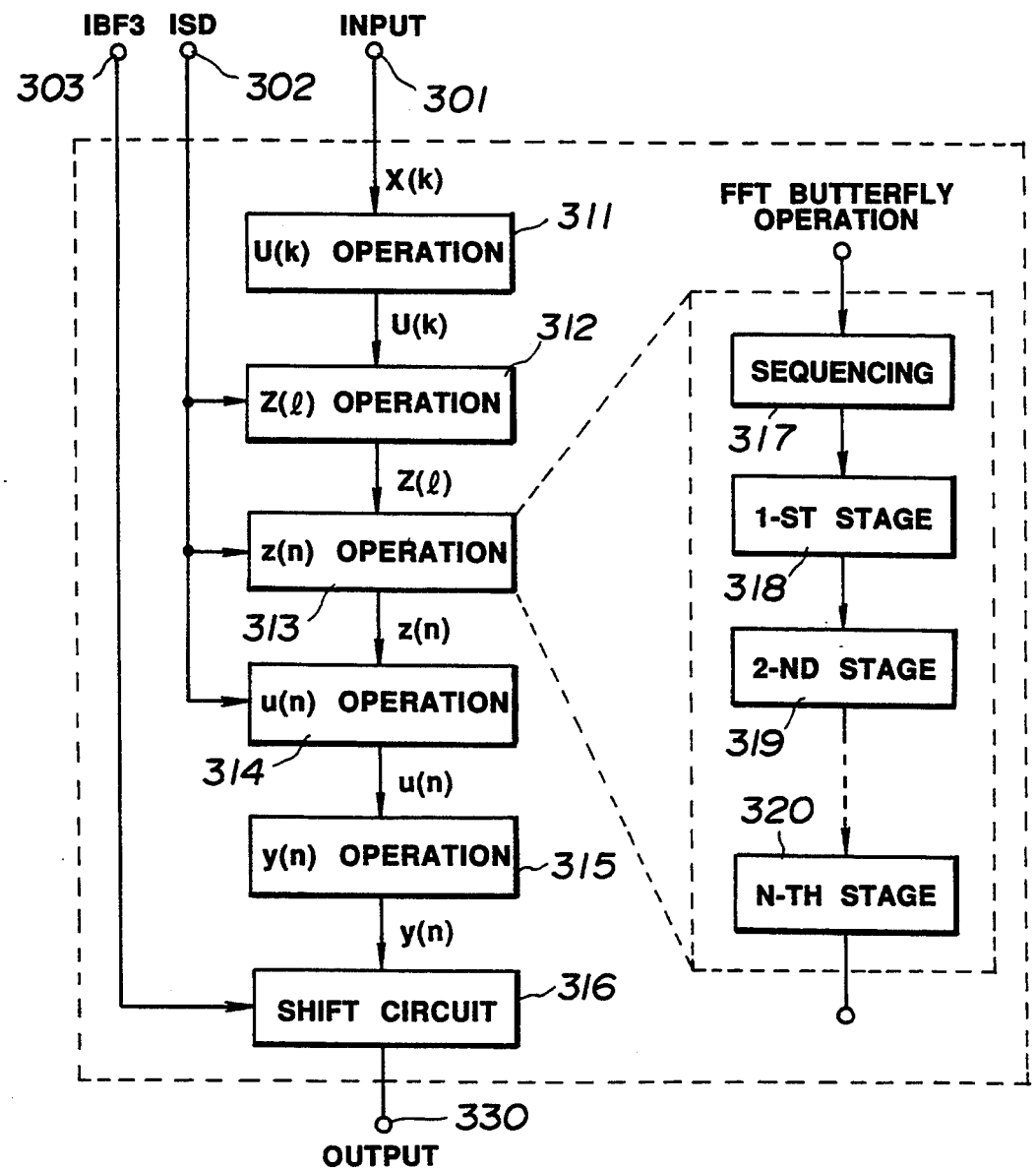
FIG. 10 is a block diagram showing in more detail the internal configuration of the IMDCT-H circuit and the IMDCT-M circuit shown in FIG. 9.

The IMDCT-H circuit 223 and the IMDCT-M circuit 224 will now be described in more detail by reference to the more practical configuration shown in FIG. 10. FIG. 10 shows the internal configuration of the IMDCT-H circuit 223 and the IMDCT-M circuit 224, which perform the IMDCT processing.

TABLE 1

| IBF1 | −1 | 0 | 1 | 2 | 3 | 4 | 5 | 6 | 7 | 8 | 9 | 10 |
|---|---|---|---|---|---|---|---|---|---|---|---|---|
| ISD |  | 1 | 1 | 2 | 3 | 4 | 5 | 6 | 7 | 8 | 8 | 8 | 8 |

TABLE 1-continued

| | | | | | | | | | | | |
|---|---|---|---|---|---|---|---|---|---|---|---|
| FORMULA (4) | * | * | * | * | * | * | * | * | * | * | * |
| FORMULA(5) | | * | * | * | * | * | * | * | * | * | * |
| 1ST STAGE | | | * | * | * | * | * | * | * | * | * |
| 2ND STAGE | | | | * | * | * | * | * | * | * | * |
| 3RD STAGE | | | | | * | * | * | * | * | * | * |
| 4TH STAGE | | | | | | * | * | * | * | * | * |
| 5TH STAGE | | | | | | | * | * | * | * | * |
| 6TH STAGE | | | | | | | | * | * | * | * |
| FORMULA (6) | | | | | | | | | * | * | * |
| IBF3 | −1 | 0 | 0 | 0 | 0 | 0 | 0 | 0 | 1 | 2 | 3 |

In FIG. 10, the terminal 301 receives the plural spectral coefficients X(k) from the inverse floating circuit 229, the terminal 302 receives the number of scale down operations ISD from the scale down times determining circuit 227, and the terminal 303 receives the third shift quantity IBF3 from the third shift quantity calculating circuit 226. The U(k) operation circuit 311 receives the spectral coefficients X(k) from the terminal 301 and calculates U(k) from the spectral coefficients by applying formula (2). The Z(l) operation circuit 312 calculates Z(l) from U(k) by applying formula (3) or formula (4). The z(n) operation circuit 313 calculates z(n) from Z(l) by applying formula (5). The u(n) operation circuit 314 calculates u(n) from z(n) by applying formula (6). The y(n) operation circuit 315 calculates y(n) from u(n) by applying formula (8). Finally, the shift circuit 316 performs a shift operation on y(n) in response to the third shift quantity IBF3, and supplies the result to the output terminal 330. The circuit components just described successively perform operations in the order of the formulas (2), (4), (5), (6), (8) in accordance with the above-described calculation procedure.

The Z(l) operation circuit 312, the z(n) operation circuit 313, and the u(n) operation circuit 314 are supplied with the number of scale down operations ISD from the input terminal 302, and implement scale down in response to the received value of ISD. In addition, the shift circuit 316 is supplied with the third shift quantity IBF3 from the input terminal 303. The shift circuit 316 shifts all samples in the block of samples constituting the output y(n) of the y(n) operation circuit 315 by the third shift quantity IBF3. The output of the shift circuit 316 is fed to the output terminal 330 as the output of the IMDCT-H circuit 223 or the IMDCT-M circuit 224. By the method just described, the shift quantity corresponding to the first shift quantity IBF1, i.e., the first block floating quantity, is completely released. It should be noted that the blocks of plural samples constituting the outputs of the IMDCT-H circuit 223 and the IMDCT-M circuit 224 have their scale reduced by one half, i.e., each sample is shifted by one bit towards the least significant bit.

The z(n) operation circuit 313 performs the FFT operation by implementing the N stages ($2^N=M/2$) of the butterfly operation, and includes the sequencing circuit 317 for sequencing the elements of Z(l) received from the Z(l) operation circuit 312. The z(n) operation circuit also includes the first through N-th stage operation circuits 318 through 320 which perform the butterfly operation. The z(n) operation circuit 313 receives the value of the number of scale down operations ISD from the input terminal 302, and implements scale down in response to that value.

Figure 11:
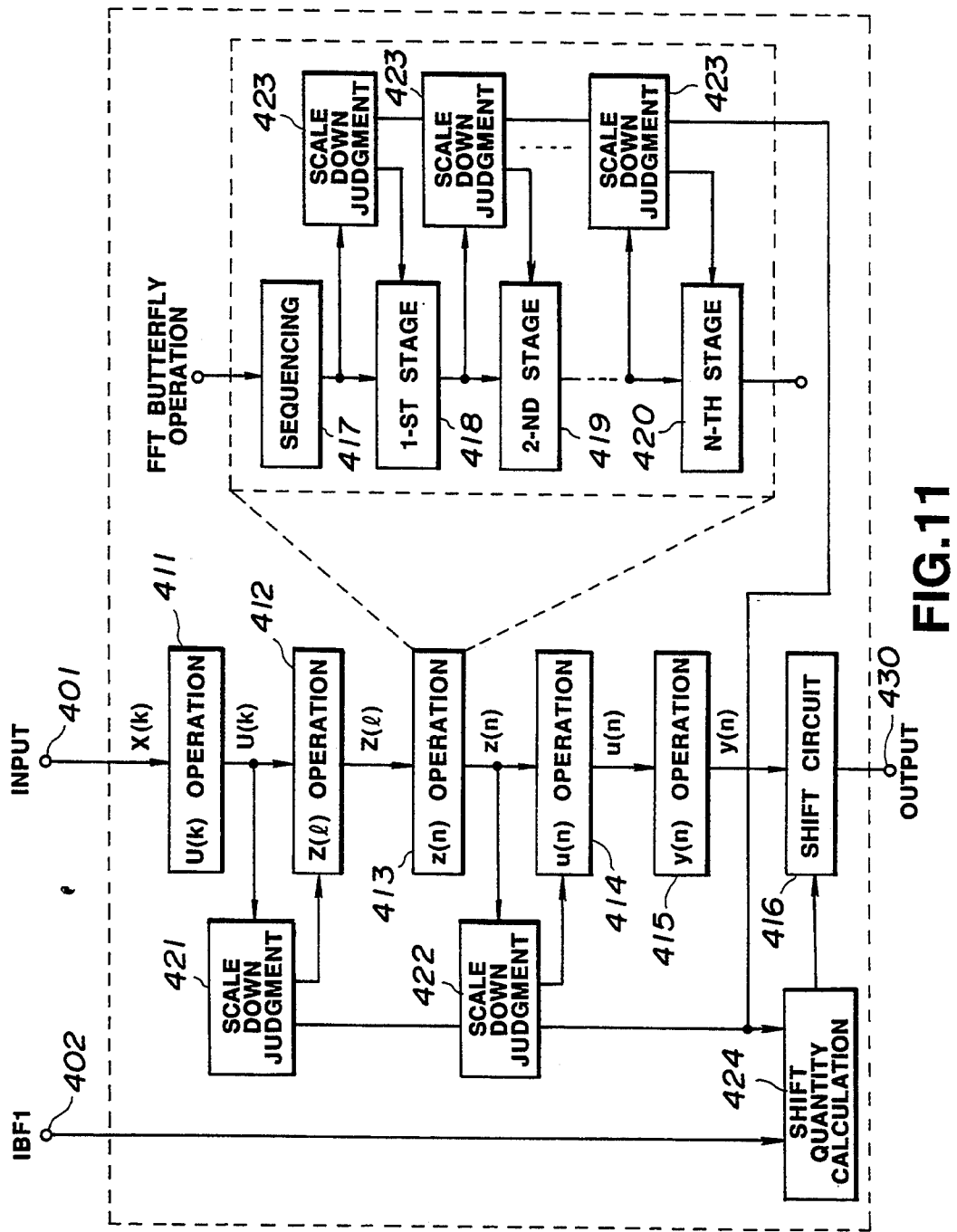
FIG. 11 is a block diagram showing in more detail the internal configuration of the IMDCT-L circuit shown in FIG. 9.
Figure 12A:
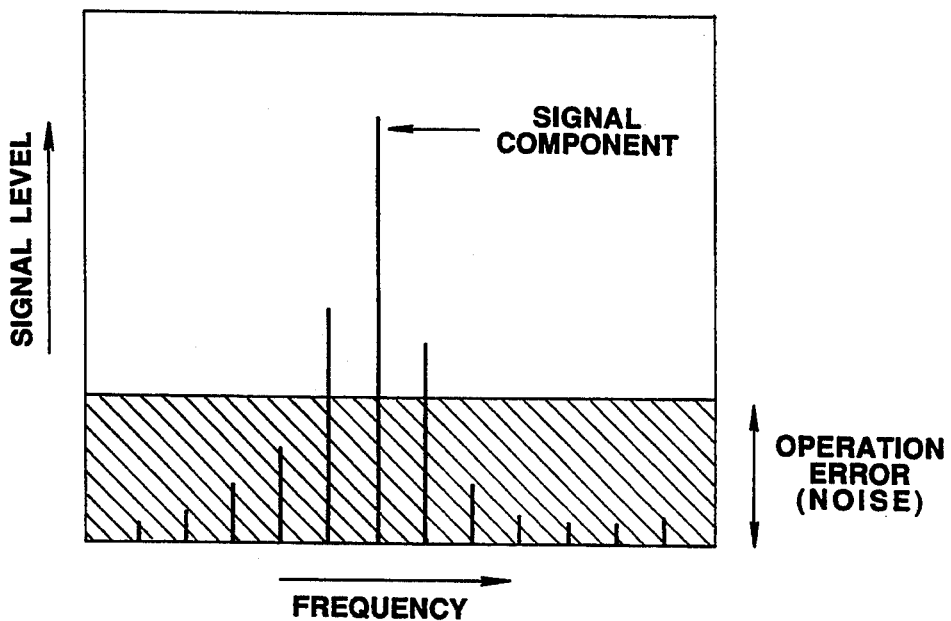
FIGS. 12(a) and 12(b) are a level versus frequency graph showing the relationship between the tonality of the signal and the audibility of the noise resulting from operational errors.
Figure 12B:
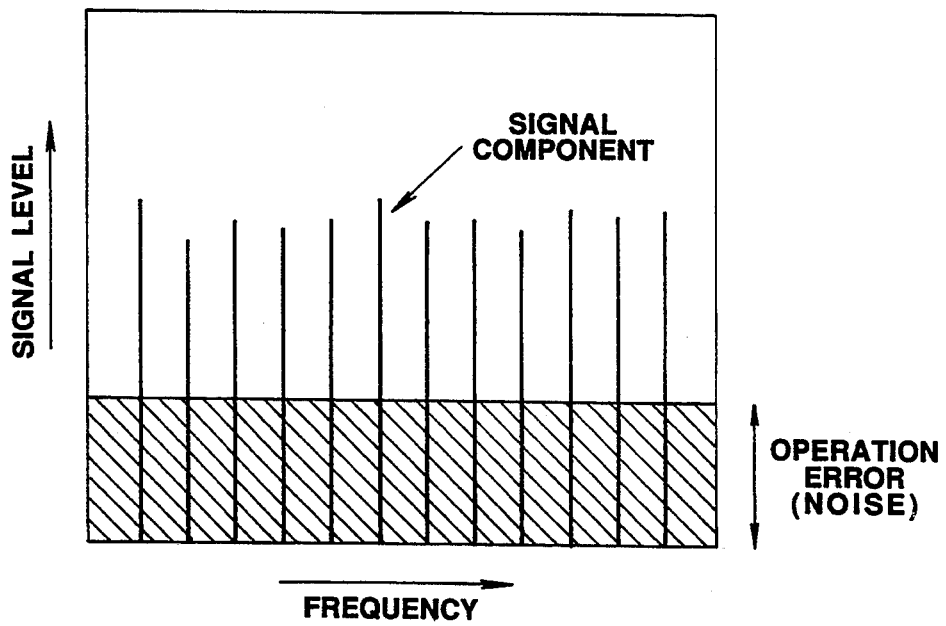

The IMDCT-L circuit 225 will now be described with reference to FIG. 11, which is a block diagram showing the operations performed in the IMDCT-L circuit 225. In FIG. 11, the IMDCT-L circuit receives blocks of spectral coefficients in which the second block floating has been released via the input terminal 401. The IMDCT-L circuit performs an IMDCT calculation procedure similar to the calculation procedure performed by the IMDCT-H circuit 223 and the IMDCT-M circuit 224. The operation of the IMDCT-L circuit 225 differs from the operations of the IMDCT-H circuits 223 and the IMDCT-M circuit 224 in the way in the which scale down is implemented. In the IMDCT-L circuit 225, a decision on whether or not to implement scale down is made by reference to the values of the elements of the input to each of the serially-arranged operation circuits.

For example, in FIG. 11, a block of spectral coefficients X(k) received via the input terminal 401 is fed to the U(k) operation circuit 411, which calculates U(k) from the block of spectral coefficients by applying formula (2). Then, the output U(k) from the U(k) operation circuit 411 is fed to the scale down judgment circuit 421. The scale down judgment circuit 421 determines whether or not scale down will be implemented in the Z(l) operation circuit 412, which calculates Z(l) from U(k) by applying formula (3) or formula (4). The Z(l) operation circuit performs operations using formula (3) or formula (4) in response to the judgment results from the scale down judgment circuit 421 to provide Z(l). The result of the scale down judgment by the scale down judgment circuit 421 is temporarily stored in a memory, such as a register, etc., and is then fed to the shift quantity calculating circuit 424 via the succeeding scale down judgment circuit 422.

In the configuration shown in FIG. 11, the scale down judgment circuit 422 and the scale down judgment circuit 423 respectively determine whether or not scale down will be implemented in the z(n) operation circuit 413, and in the u(n) operation circuit 414, which are both similar to the corresponding circuits shown in FIG. 10. The scale down judgment circuit 422 and 423 operate in a manner similar to that described above. Depending on the judgment of the scale down judgment circuits, the required scale down is implemented.

In the scale down judgment circuits 421, 422, and 423, values serving as scale down criteria are preset for each of the calculation formulas for which scale down is required. The scale down judgment circuits 421,422, and 423 compare the values of the elements of the input to the respective operation circuit with the value of the respective scale down criterion. For example, the scale down judgment circuit 421 compares the value of each element of U(k) entering the Z(l) operation circuit 412 with its scale down criterion. Scale down is not implemented when the absolute values of all the elements of the input (e.g., all the elements of U(k)) are less than the respective scale down criterion. On the other hand, scale down is implemented if the absolute value of any one of the elements of the input is greater than the respective scale down criterion.

A scale down criterion is a value with which the values of the elements of the input to an operation circuit are compared to determine whether scale down will be necessary to prevent the values of the elements of the output of the operation circuit causing an overflow. The values of the scale down criteria are set, for example, as follows.

It will be assumed that the range of values of the elements of the input and of the output is $-1.0$ through 1.0, and that values outside this range will cause an overflow. For example, if the operating circuit processes the elements of the input according to the formula $y(n)=x_1(n)+x_2(n)$, the input elements are $x_1(n)$, $x_2(n)$, and the output elements are $y(n)$. It can be said that, if the neither of the absolute values $|x_1(n)|$ and $|x_2(n)|$ of the input elements exceeds 0.5, there is no possibility that the absolute value $|y(n)|$ of the output elements will exceed 1.0, and overflow will not take place. On the other hand, if any one of the absolute values $|x_1(n)|$ and $|x_2(n)|$ exceeds 0.5, then it is possible for the absolute value $|y(n)|$ of the output elements to exceed 1.0, and for overflow to take place. Accordingly, it is necessary to implement scale down to prevent overflow from occurring.

When scale down is implemented with reference to the values of the elements of the input, in the example just described, the absolute values $|x_1(n)|$ and $|x_2(n)|$ of the input elements are compared with 0.5. If none of the absolute values $|x_1(n)|$ and $|x_2(n)|$ exceeds 0.5, there is no need to implement scale down because overflow is impossible. On the other hand, if any one of the absolute values $|x_1(n)|$ and $|x_2(n)|$ exceeds 0.5, scale down must be implemented to avoid the possibility of an overflow. Thus, by comparing the values of the input elements with a scale down criterion, in this example, 0.5, it can be determined whether or not there scale down need be implemented. Of course, if the calculation formula is changed, the value of the scale down criterion must also be changed accordingly to determine the maximum absolute value of the elements of the input that, after calculation, will produce an output absolute value of 1.

The scale down criterion for the Z(l) operation circuit 412, which, in practice applies formula (4), will now be described in more detail. In the Z(l) operation circuit 412, calculation is carried out in accordance with formula (4). Since the maximum value that formula (12) can take is 1.414, if the absolute value of the elements of the input $|U(k)|$ does not exceed $1/1.414=0.707$, there is no possibility that the absolute values of the elements of either of the outputs $|Re(z(l))|$ and $|Im(Z(l))|$ will exceed 1.0.

$$|\cos(-2\pi l/M)| + |\sin(-2\pi l/M)| \tag{12}$$

Accordingly, it is desirable to set the scale down criterion of the Z(l) operation circuit 412, which operates in accordance with formula (4), to 0.707. However, to simplify the scale down judgment, the scale down criterion may be set to 0.5. The scale down criteria may be set similarly in the respective stages of the z(n) operation circuit 413, applying formula (5), and of the u(n) operation circuit 414, applying formula (6).

In FIG. 11, the first shift quantity IBF1, received via the input terminal 402, is fed to the scale down judgment circuits 421, 422, and 423, and to the shift quantity calculating circuit 424. The shift quantity calculating circuit 424 calculates the shift quantity IBF4 for carrying out a shift operation in the shift circuit 416. The total number of times a scale down operation have been implemented is indicated by ISDL. The shift quantity calculating circuit 424 calculates this quantity in response to shift quantity information provided by the scale down judgment circuits 421, 422, and 423. The shift quantity calculating circuit 424 calculates the shift quantity IBF4 according to formula (13):

$$IBF4=IBF1-ISDL+1 \tag{13}$$

The shift quantity IBF4 is the shift quantity that sets the scale of the elements of the output of the IMDCT-L circuit 225 to be uniformly one half of the normal scale, i.e., the elements of the output of the IMDCT-L circuit are shifted by one bit towards the least significant bit.

The shift circuit 416 shifts each element of the output $y(n)$ of the $y(n)$ operation circuit 415, which calculates according to formula (8), by the shift quantity indicated by the shift quantity IBF4. The shifted output elements are fed to the output terminal 430, where they provide the output of the IMDCT-L circuit 225, i.e., the frequency range signal in the low-frequency range. As a result of the shift applied in the processing by the IMDCT-L circuit, block floating having a shift quantity corresponding to the first shift quantity IBF1, i.e., the first block floating quantity, is completely released. It is to be noted that scale of the elements of the output of the IMDCT-L circuit 225 is reduced by one half, i.e., the elements are shifted by one bit towards the least significant bit.

Returning to FIG. 9, the outputs of the IMDCT-H circuit 223 and the IMDCT-M circuit 224 are respectively fed to the one-bit shift circuits 220 and 221. These circuits shift the elements of the outputs of the IMDCT circuits 223 and 224, which have their scale reduced by $\frac{1}{2}$, by one bit towards the most significant bit to restore the scale of the output elements to normal. After this operation, the first block floating is completely released.

The output of the IMDCT-L circuit 225 is fed to the one-bit shift circuit 222, where the elements of the output, which have their scale reduced by $\frac{1}{2}$, are shifted by one bit towards the most significant bit to restore the scale of the output elements to normal. After these operations, the first block floating is completely released.

The outputs of one-bit shift circuits 221, 222 are synthesized by the frequency range band synthesis filter 202, and the output of the one-bit shift circuit 220 and the output of the frequency range synthesis filter 202 are synthesized by the frequency range synthesis filter 201 to provide the digital output signal. The digital output signal is fed to the output terminal 200.

As described above, the digital signal expander according to the invention adaptively controls the scale down operation in processing the frequency range signal in the low frequency range, making it possible to improve the operational efficiency and the operational accuracy of the IMDCT operation in the expander. In addition, this invention may be applied not only to the compressor/expander of the above-described embodiment, but also to other compressor/expanders. It is to be noted that this invention is not limited only to the above-mentioned embodiment, but may be applied not only to a circuit for compressing and expanding an audio PCM signal, as described above, but also to, e.g., a circuit for compressing and expanding a digital speech signal, etc.

In accordance with the digital signal compressor/expander of this invention, since the scale down applied during the orthogonal transform processing is adaptively judged, on the compressor side, in each calculation formula in response to the values being processed. For this reason, overflows in the processing operations can be avoided, and unnecessary scale down operations, which may degrade the operational accuracy, and hence the sound quality, can be eliminated. Noise resulting from operational errors is also reduced.

Further, on the expander side, the adaptive scale down operation acts in such a manner that, when the tonality of the signal being decoded increases, i.e., the signal becomes closer to a sine wave signal, the number of scale down times is reduced. Thus, the adaptive scale down operation is particularly effective with a signal, such as a sine wave, which has a relatively limited ability to mask noise. In addition, in a circuit in which frequency range signals in plural frequency ranges are individually orthogonally transformed, the adaptive scale down operation is applied only to the orthogonal transform of the frequency range signal in the low frequency range. A fixed scale down operation is used in the orthogonal transforms of the signals in the middle- and high-frequency ranges. For this reason, the increase in the scale of the hardware required to obtain the increase in operational quantity is minimized.

What is claimed is:

1. A digital signal processing system wherein a digital input signal is compressed to provide a compressed signal for recording on a medium, and the compressed signal, reproduced from the medium, is expanded to provide a digital output signal, the system comprising:
   a compressor, the compressor including:
      non-block frequency analysis means for carrying out a frequency analysis of the digital input digital signal to provide a frequency range signal in each of plural frequency ranges, the non-block frequency analysis means carrying out the frequency analysis without dividing the digital input signal into blocks,
      block frequency analysis means for carrying out a block frequency analysis of the frequency range signals from the non-block frequency analysis means to provide a block of spectral coefficients, the block frequency analysis means including means for dividing the frequency range signals in time into blocks, and
      means for quantizing the block of spectral coefficients from the block frequency analysis means to provide a block of the compressed signal;
   an expander, the expander including:
      block frequency synthesis means for performing a block frequency synthesis to transform, from a frequency base to a time base, the spectral coefficients in each of the frequency ranges in each block of the compressed signal reproduced from the medium, the block frequency synthesis means providing, in each of the frequency ranges, a block of a reproduced frequency range signal, and
      non-block frequency synthesis means for conducting frequency synthesis of the reproduced frequency range signals from the block frequency synthesis means to provide the digital output signal, the non-block frequency synthesis means conducting the frequency synthesis without dividing the reproduced frequency range signals into blocks; and
   scale-down means for scaling down values in one of the block frequency analysis performed by the block frequency analysis means and the block frequency synthesis performed by the block frequency synthesis means, the scale-down means operating to cause noise levels resulting from scaling down the values to be different in each of the frequency ranges.

2. The digital signal processing system of claim 1, wherein:
   the digital output signal is for perception according to a hearing sense characteristic; and
   the scale-down means operates to cause the noise levels to be different in each of the frequency ranges according to the hearing sense characteristic.

3. The digital signal processing system of claim 1, wherein:
   the digital output signal is for perception according to a hearing sense characteristic; and
   the scale-down means operates to reduce the noise level in one of the frequency ranges wherein the hearing sense characteristic requires a large dynamic range.

4. The digital signal processing system of claim 1, wherein:
   the digital output signal is for perception according to a hearing sense characteristic; and
   the scale-down means operates to reduce the noise level in one of a low frequency one and a low frequency one and a medium frequency one of the frequency ranges wherein the hearing sense characteristic requires a large dynamic range.

5. The digital signal processing system of claim 1, wherein:
   the digital output signal is for perception according to a hearing sense characteristic;
   the scale-down means operates to scale down the values in the one of the block frequency analysis performed by the block frequency analysis means and the block frequency synthesis performed by the block frequency synthesis means in one of the frequency ranges wherein the hearing sense characteristic does not require a large dynamic range.

6. The digital signal processing system of claim 1, wherein:
   the digital output signal is for perception according to a hearing sense characteristic;
   the scale down means operates to scale down the values in the one of the block frequency analysis performed by the block frequency analysis means and the block frequency synthesis performed by the block frequency synthesis means in a higher frequency one the frequency ranges wherein the hearing sense characteristic does not require a large dynamic range.

7. The digital signal processing system of claim 1, wherein the scale down means:
   operates to scale down the values in the one of the block frequency analysis performed by the block frequency analysis means and in the block frequency synthesis performed by the block synthesis means in each of the frequency ranges; and
   in one of the frequency ranges, performs an adaptive scale down operation wherein the values are scaled down a number of times adaptively determined by a judgment of values in the one of the block frequency analysis performed by the block frequency analysis means and the block frequency synthesis performed by the block frequency synthesis means.

8. The digital signal processing system of claim 7, wherein the scale down means additionally comprises:
   means for judging a signal tonality to provide a magnitude of the signal tonality, and
   means for adaptively determining, in response to the magnitude of the signal tonality, the number of times the values are to be scaled down.

9. The digital signal processing system of claim 1, wherein:
   the block frequency analysis means includes means for applying block floating to the outputs in the respective frequency ranges of the non-block frequency analysis means, and
   the block floating is released by the block frequency synthesis performed by the block frequency synthesis means.

10. The digital signal processing system of claim 9, wherein the scale down means repeatedly scales down the values in the block frequency synthesis performed by the block frequency synthesis means to release the block floating.

11. The digital signal processing system of claim 10, wherein:
   the block floating means applies block floating defined by a block floating magnitude; and
   the scale down means repetitively scales down the values in the block frequency synthesis performed by the block frequency synthesis means a number of times corresponding to the block floating magnitude to release the block floating.

12. The digital signal processing system of claims 7, 8, 10, or 11, wherein the scale down means operates to prevent occurrence of an overflow in the one of the block frequency analysis performed by the block frequency analysis means and the block frequency synthesis performed by the block frequency synthesis means.

13. The digital signal processing system of claims 7 or 8, wherein the scale down means scales down the values in the one of the block frequency analysis performed by the block frequency analysis means and the block frequency synthesis performed by the block frequency synthesis means without carrying out the adaptive scale down operation in a higher frequency one of the frequency ranges.

14. The digital signal processing system of claims 7 or 8, wherein the scale down means scales down the values in one of the block frequency analysis performed by the block frequency analysis means and the block frequency synthesis performed by the block frequency synthesis means by performing the adaptive scale down operation only in a lower frequency one of the frequency ranges.

15. Apparatus for compressing a digital input signal to provide a compressed signal, the apparatus comprising:
   filter means for dividing the digital input signal by frequency to provide a frequency range signal in each of plural frequency ranges;
   first block floating means for applying first block floating processing to a block of the frequency range signal in each of the frequency ranges to provide a block floating processed signal in each of the frequency ranges, the blocks of the frequency range signals having a block size;
   orthogonal transform means for carrying out orthogonal transform processing of the block of the block floating processed signal in each of the frequency ranges to provide spectral coefficients, the orthogonal transform means including scale down means for performing scale down operations on values processed by the orthogonal transform means in each of the frequency ranges, the scale down means carrying out an adaptively controlled scale down operation on the values in the orthogonal transform processing in a lower frequency one of the frequency ranges, and for carrying out a fixed scale down operation on the values in the orthogonal transform processing in a higher frequency one of the frequency ranges;
   second block floating means for applying second block floating processing to blocks of the spectral coefficients to provide second block floating processed spectral coefficients, the blocks being obtained by grouping the spectral coefficients by frequency, and having a block size smaller than the block size of the blocks whereto the first block floating processing is applied; and
   means for quantizing the second block floating processed spectral coefficients to provide the compressed signal.

16. The apparatus of claim 15, wherein the orthogonal transform processing means carries out Modified Discrete Cosine Transform processing.

17. The apparatus of claims 15 or 16, wherein the block size whereon the orthogonal transform processing means performs the orthogonal transform processing is variable.

18. Apparatus for expanding a compressed digital signal to provide an output signal, the compressed digital signal being obtained by deriving a frequency range signal in each of plural frequency ranges from a digital input signal, applying first block floating processing to a block of the frequency range signal in each of the frequency ranges to provide a block floating processed signal in each of the frequency ranges, performing orthogonal transform processing of the block of the block floating processed signal in each of the frequency ranges to provide spectral coefficients, applying second block floating processing to blocks of the spectral coefficients to provide second block floating processed spectral coefficients, the blocks being obtained by grouping the spectral coefficients by frequency and having a block size smaller than the block size of the blocks whereto the first block floating processing is applied, and quantizing the second block floating processed spectral coefficients to provide the compressed signal,
   the apparatus comprising:
   second block floating release means for releasing the second block floating applied to the second block floating processed spectral coefficients to provide a block of second block floating released spectral coefficients;
   inverse orthogonal transform means for carrying out inverse orthogonal transform processing of the block of the second block floating released spectral coefficients in each of the frequency ranges to provide a recovered frequency range signal in each of the frequency ranges, the inverse orthogonal transform means including:
      means for performing an adaptively controlled scale down operation on values in the inverse orthogonal transform processing of the second block floating released spectral coefficients in a lower frequency one of the frequency ranges, and means for conducting a fixed scale down operation on values in the inverse orthogonal transform processing of the second block floating released spectral coefficients in a higher frequency one of the frequency ranges; and
a synthesis filter means for synthesizing the recovered frequency range signals to provide the output signal.

19. The apparatus of claim 16, wherein the inverse orthogonal transform processing means performs Inverse Modified Discrete Cosine Transform processing.

20. The apparatus of claims 16 or 19, wherein the block size whereon the inverse orthogonal transform processing means performs the inverse orthogonal transform processing is variable.

21. A digital signal expander wherein a compressed signal is expanded to provide a digital output signal, the compressed signal being obtained by conducting a non-block frequency analysis of a digital input signal to provide a frequency range signal in each of plural frequency ranges, dividing each frequency range signal into blocks, carrying out, on every block of the frequency range signal in each of the frequency ranges, a block frequency analysis to provide spectral coefficients, and quantizing the spectral coefficients to provide a block of the compressed signal, the expander comprising:
block frequency synthesis means for performing a block frequency synthesis to transform, from a frequency base to a time base, the spectral coefficients in each of the frequency ranges in each block of the compressed signal, the block frequency synthesis means providing, in each of the frequency ranges, a block of a reproduced frequency range signal;
non-block frequency synthesis means for performing a frequency synthesis of the reproduced frequency range signals from the non-block frequency synthesis means to provide the digital output signal, the non-block frequency synthesis means performing the frequency synthesis without dividing the reproduced frequency ranges signals into blocks; and
scale-down means for scaling down values in the block frequency synthesis performed by the block frequency synthesis means, the scale-down means operating to cause noise levels resulting from scaling down the values to be different in each of the frequency ranges.

22. The expander of claim 21, wherein:
the digital output signal is for perception according to a hearing sense characteristic; and
the scale-down means operates to cause the noise levels to be different in each of the frequency ranges according to the hearing sense characteristic.

23. The expander of claim 21, wherein:
the digital output signal is for perception according to a hearing sense characteristic; and
the scale-down means operates to reduce the noise level in one of the frequency ranges wherein the hearing sense characteristic requires a large dynamic range.

24. The expander of claim 21, wherein:
the digital output signal is for perception according to a hearing sense characteristic; and
the scale-down means operates to reduce the noise level in one of a low frequency one and a low frequency one and a medium frequency one of the frequency ranges wherein the hearing sense characteristic requires a large dynamic range.

25. The expander of claim 21, wherein:
the digital output signal is for perception according to a hearing sense characteristic; and
the scale down means operates to scale down the values in the block frequency synthesis performed by the block frequency synthesis means in one of the frequency ranges wherein the hearing sense characteristic does not require a large dynamic range.

26. The expander of claim 21, wherein:
the digital output signal is for perception according to a hearing sense characteristic; and
the scale down means operates to scale down the values in the block frequency synthesis performed by the block frequency synthesis means in a higher frequency one of the frequency ranges wherein the hearing sense characteristic does not require a large dynamic range.

27. The expander of claim 21, wherein the scale down means:
scales down the values in the block frequency synthesis performed by the block frequency synthesis means in each of the frequency ranges; and
in one of the frequency ranges, performs an adaptive scale down operation wherein the values are scaled down a number of times adaptively determined by a judgment of the values in the block frequency synthesis performed by the block frequency synthesis means.

28. The expander of claim 27, wherein the scale down means additionally comprises:
means for judging a signal tonality to provide a magnitude of the signal tonality; and
means for adaptively determining, in response to the magnitude of the signal tonality, the number of times the values are to be scaled down.

29. The expander of claim 21, wherein the compressed signal is obtained by additionally carrying out block floating, defined by a block floating magnitude, in the block frequency analysis carried out on every block of the frequency range signal in each of the frequency ranges, and wherein the block floating is released by the block frequency synthesis performed by the block frequency synthesis means.

30. The expander of claim 29, wherein the scale down means repeatedly scales down the values in the block frequency synthesis performed by the block frequency synthesis means to release the block floating.

31. The expander of claim 30, wherein the scale down means repetitively scales down the values in the block frequency synthesis performed by the block frequency synthesis means a number of times corresponding to the block floating magnitude to release the block floating.

32. The expander of claims 27, 28, 29, or 30, wherein the scale down means operates to prevent occurrence of an overflow in the block frequency synthesis performed by the block frequency synthesis means.

33. The expander of claims 27 or 28, wherein the scale down means scales down the values in the block frequency synthesis performed by the block frequency synthesis means without performing the adaptive scale down operation in a higher frequency one of the frequency ranges.

34. The expander of claims 27 or 28, wherein the scale down means scales down the values in the block frequency synthesis performed by the block frequency synthesis means by performing the adaptive scale down operation in only a lower frequency one of the frequency ranges.

* * * * *